(12) United States Patent
Dixon et al.

(10) Patent No.: US 10,865,460 B2
(45) Date of Patent: Dec. 15, 2020

(54) PROCESS FOR LEACHING METAL SULFIDES WITH REAGENTS HAVING THIOCARBONYL FUNCTIONAL GROUPS

(71) Applicant: The University of British Columbia, Vancouver (CA)

(72) Inventors: David Dixon, Delta (CA); Edouard Asselin, Richmond (CA); Zihe Ren, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 16/743,675

(22) Filed: Jan. 15, 2020

(65) Prior Publication Data

US 2020/0181731 A1    Jun. 11, 2020

Related U.S. Application Data

(62) Division of application No. 15/566,684, filed as application No. PCT/CA2016/050444 on Apr. 15, 2016.

(Continued)

(51) Int. Cl.
*C22B 3/08* (2006.01)
*C22B 3/42* (2006.01)
(Continued)

(52) U.S. Cl.
CPC ............ *C22B 3/08* (2013.01); *C01G 1/00* (2013.01); *C01G 3/10* (2013.01); *C01G 11/00* (2013.01); *C01G 49/14* (2013.01); *C01G 53/10* (2013.01); *C22B 3/0004* (2013.01);

*C22B 3/42* (2013.01); *C22B 15/0071* (2013.01); *C22B 17/04* (2013.01); *C22B 23/043* (2013.01);

(Continued)

(58) Field of Classification Search
None
See application file for complete search history.

(56) References Cited

U.S. PATENT DOCUMENTS 4,561,947 A    12/1985 Schulze
4,913,730 A     4/1990 Deschenes et al.
(Continued)

FOREIGN PATENT DOCUMENTS

CA    2023119    2/1991
CA    2976958    8/2017
(Continued)

OTHER PUBLICATIONS

Armstrong et al., (2000) "Cross-Referenced Combinatorial for the Discovery of Metal-Complexing Ligands: Library Deconvolution by LC-MS", Analyst, 125: 2206-2215.

(Continued)

*Primary Examiner* — Melissa S Swain
(74) *Attorney, Agent, or Firm* — Rudy J. Ng; Bozicevic, Field & Francis LLP

(57) ABSTRACT

This application pertains to methods of recovering metals from metal sulfides that involve contacting the metal sulfide with an acidic sulfate solution containing ferric sulfate and a reagent that has a thiocarbonyl functional group, wherein the concentration of reagent in the acidic sulfate solution is sufficient to increase the rate of metal ion extraction relative to an acidic sulfate solution that does not contain the reagent, to produce a pregnant solution containing the metal ions.

38 Claims, 18 Drawing Sheets

Related U.S. Application Data

(60) Provisional application No. 62/149,015, filed on Apr. 17, 2015.

(51) Int. Cl.

| | | |
|---|---|---|
| *C22B 15/00* | (2006.01) | |
| *C22B 3/00* | (2006.01) | |
| *C22B 3/20* | (2006.01) | |
| *C25C 1/12* | (2006.01) | |
| *C01G 3/10* | (2006.01) | |
| *C01G 53/10* | (2006.01) | |
| *C01G 11/00* | (2006.01) | |
| *C01G 49/14* | (2006.01) | |
| *C01G 1/00* | (2006.01) | |

(52) U.S. Cl.
CPC .............. *C25C 1/12* (2013.01); *Y02P 10/234* (2015.11); *Y02P 10/236* (2015.11)

(56) References Cited

U.S. PATENT DOCUMENTS

| | | | |
|---|---|---|---|
| 5,989,311 | A | 11/1999 | Han et al. |
| 8,163,063 | B2 | 4/2012 | Manabe |
| 8,287,623 | B2 | 10/2012 | Manabe |
| 8,865,119 | B2 | 10/2014 | Kuwano et al. |
| 9,290,827 | B2 | 9/2016 | Hatano et al. |
| 2004/0197249 | A1 | 10/2004 | Wan et al. |
| 2008/0026450 | A1 | 1/2008 | Ohtsuka et al. |
| 2008/0286180 | A1 | 11/2008 | Jones |
| 2011/0290657 | A1 | 12/2011 | Lavin et al. |
| 2012/0251417 | A1 | 10/2012 | Shimomura et al. |
| 2013/0333524 | A1 | 12/2013 | Aghemio Rodriguez |
| 2017/0335428 | A1 | 11/2017 | Gutiérrez et al. |

FOREIGN PATENT DOCUMENTS

| | | |
|---|---|---|
| CL | 200400703 | 3/2005 |
| CL | 200702165 | 2/2008 |
| CL | 200801423 | 8/2008 |
| CL | 2009000554 | 3/2009 |
| CL | 2016001188 | 2/2017 |
| CN | 1081471 | 2/1994 |
| GB | 2180829 | 4/1987 |
| GB | 2349876 | 11/2000 |
| JP | 090131127 | 1/1997 |
| JP | 11506808 | 6/1999 |
| MX | 2008003249 | 9/2009 |
| SU | 1636463 | 3/1991 |
| WO | WO 1998008585 | 8/1997 |
| WO | WO 1998008585 | 3/1998 |
| WO | WO 2004029306 | 4/2004 |
| WO | 2007042604 | 4/2007 |
| WO | WO 2007042604 | 4/2007 |
| WO | WO 2015059551 | 9/2015 |
| WO | WO 2016141438 | 9/2016 |

OTHER PUBLICATIONS

Castromil, Portugal Resume. Source https://medgoldresources.com (Jan. 13, 2015).

Deschenes et al., (1988) "Leaching of Gold from a Chalcopyirite Concentrate by Thiourea", Hydrometallurgy 20: 179-202.

Li et al., (2002) "Reaction Kinetics for Gold Dissolution in Acid Thiourea Solution using Formamidine as Oxidant", Hydrometallurgy, 63: 215-223.

Orgul and Atalay (2000) "Gold Extraction from Kaymaz Gold Ore by Thiourea Leaching," Proceedings of the XXI International Mineral Processing Congress, Hydro and Biohydrometallurgy, 13: C6-22-C6-28.

Whitehead et al., (2007) "Application of 1-alkyl-3methyl-imidazolium Ionic Liquids in the Oxidative Leaching of Sulphidic Copper, Gold, and Silver Ores", Hydrometallurgy 88: 109-120.

Yang et al., (2010) "The Interaction of Thiourea and Formamidinee Disulfide in the Dissolution of Gold in Sulfuric Acid Solutions", Minerals Engineering, 23: 698-704.

Bowmaker et al., (2009) "Crystal Structures and Vibrational Spectroscopy of Copper(I) Thiourea Complexes," Inorganic Chemistry 48(1): 350-368.

Doona and Stanbury (1996) "Equilibrium and Redox Kinetics of Copper(II)-Thiourea Complexes," Inorganic Chemistry 35(11): 3210-3216.

Grgorova and Wright (1986) "Simultaneous determination of thiourea and formamidine disulphide, using reversed-phase high-performance liquid chromatography and a UV detector," Journal of Chromalography 368: 444-449.

Li and Miller (2002) "Reaction Kinetics for Gold Dissolution in Acid Thiourea Solution using Formamidine as Oxidant", Hydrometallurgy, 63: 215-223.

Mironov and Tsvelodub (1996) "Complexation of Copper(I) by Thiourea in Acidic Aqueous Solution," Journal of Solution Chemistry 25(3) 315-325.

Winand (1991) "Chloride hydrometallurgy" Hydrometallurgy 27: 285-316.

Zhu et al., (1992) "The redox reaction between thiourea and ferric iron and catalysis of sulphide ores," Hydrometallurrgy 28, 381-397.

Jansons (1976), "Dithiocarboxylic Acids, Their Esters, and Metal Dithiocarboxylates", Russian Chemical Reviews 45(11):1035-1051.

"Thioaldehydes", Wikipedia, accessed online Oct. 16, 2020; https://ru.wikipedia.org/wiki/thioaldehydes; 1 page.

"Thioketones", Wikipedia, accessed online Oct. 16, 2020;https://ru.wikipedia.org/wiki/thioketones; 3 pages.

Umland et al., (1975) "Complex Compounds in Analytical Chemistry", Moscow, 70-72 English translation.

Umland et al., (1975) "Coordination compounds in analytical chemistry. Theory and practice." Mir, Moscow, 127-128 English translation and Russian.

PROCESS FOR LEACHING METAL SULFIDES WITH REAGENTS HAVING THIOCARBONYL FUNCTIONAL GROUPS

This application claims priority to U.S. Patent Application No. 62/149,015, filed Apr. 17, 2015, the contents of which are incorporated herein by reference.

BACKGROUND

1. Field of the Disclosure

This disclosure pertains to methods for leaching metals from metal sulfide-containing ores. More particularly it pertains to a hydrometallurgical process for the extraction of metals from metal sulfide-containing ores using reagents having a thiocarbonyl functional group.

2. Description of Related Art

Aqueous processing of minerals presents several advantages over pyrometallurgical approaches, particularly when dealing with complex and/or low-grade ores. The main disadvantage of hydrometallurgical processes, when applied to several metal sulfide ores, is the low extraction rates that are observed. It is desirable to develop a process where high metal extractions can be achieved in time scales that are of industrial interest.

Chalcopyrite, for example, is a semiconductor, and therefore corrodes electrochemically in oxidizing solutions. In ferric sulfate media, the overall leaching reaction is as follows:

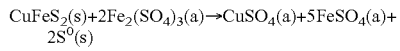
$$CuFeS_2(s) + 2Fe_2(SO_4)_3(a) \rightarrow CuSO_4(a) + 5FeSO_4(a) + 2S^0(s)$$

This reaction may be represented as a combination of anodic and cathodic half-cell reactions:

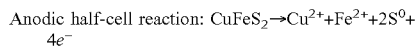
Anodic half-cell reaction: $CuFeS_2 \rightarrow Cu^{2+} + Fe^{2+} + 2S^0 + 4e^-$

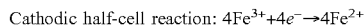
Cathodic half-cell reaction: $4Fe^{3+} + 4e^- \rightarrow 4Fe^{2+}$

A fundamental problem with chalcopyrite oxidation is that chalcopyrite mineral surfaces become resistant to electrochemical breakdown at solution potentials above a certain level (generally considered to be about 550 to 600 mV vs Ag/AgCl). It is widely held that this results from the formation of some sort of passivating film on the mineral surface that most likely consists of an altered, partially Fe-depleted form of chalcopyrite. It is desirable to provide leaching processes in which such passivation is reduced or avoided.

Some work has been done in extractive hydrometallurgy to recover precious metals such as gold and silver from copper concentrates or chalcopyrite residues after copper extraction. Deschênes and Ghali (Hydrometallurgy 20:129-202) demonstrated the potential application of thiourea in acidic sulfate leaching of sulfide concentrates, such as those containing chalcopyrite, to selectively recover gold and silver. Thiourea is an organosulfur compound having a thiocarbonyl functional group. However, thiourea did not appear to have an effect on the recovery of copper from copper sulfides.

SUMMARY

This disclosure relates, at least in part, to the unexpected discovery that several reagents comprising a thiocarbonyl function group (e.g. thiourea) can be used to facilitate the leaching of metal from several metal sulfides (e.g. copper from chalcopyrite) with acidic sulfate leach solutions. When added in small amounts, such reagents may increase the rate of metal leaching over that observed in its absence.

This disclosure relates to a method of recovering at least one metal from an ore containing at least one metal sulfide. The method involves contacting the ore with an acidic sulfate solution containing ferric sulfate and a reagent having a thiocarbonyl functional group to extract metal ions from the at least one metal sulfide, wherein the concentration of the reagent in the acidic sulfate solution is sufficient to increase the rate of the metal ion extraction relative to an acidic sulfate solution that does not contain the reagent, to produce a pregnant solution containing the metal ions. The method further involves recovering the at least one metal from the pregnant solution. The at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof. The concentration of the reagent may be in the range of about 0.2 mM to about 30 mM.

This disclosure also relates to a method of recovering at least one metal from an ore containing at least one metal sulfide. The method involves contacting the metal sulfide with an acidic sulfate solution containing a reagent having a thiocarbonyl functional group, wherein the initial concentration of the reagent in the acidic sulfate solution is in the range of about 0.2 mM to about 30 mM or less, to produce a pregnant solution containing metal ions. The method further involves recovering copper from the pregnant solution. The at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

In the methods described above, the concentration of the reagent in the acidic sulfate solution may be in the range of about 0.2 mM to about 20 mM, about 0.2 mM to about 10 mM, about 0.2 mM to about 5 mM, about 0.2 mM to about 4 mM, about 0.2 mM to about 3 mM, about 0.2 mM to about 2 mM, about 0.2 mM to about 1.5 mM, about 0.2 mM to about 1.0 mM, or about 0.2 mM to about 0.5 mM.

Where the metal is a copper sulfide of the formula CuxSy wherein the x:y ratio is between 1 and 2, the copper sulfide may includes chalcocite, djurleite, digenite, or a combination thereof.

In the methods described above, the reagent may be thiourea (Tu), thioacetamide (TA), sodium-dimethyldithiocarbamate (SDDC), ethylene trithiocarbonate (ETC), thiosemicarbazide (TSCA), or a combination thereof.

This disclosure yet further relates to a method of recovering a metal from an ore containing at least one metal sulfide. The method involves contacting the ore with an acidic sulfate solution comprising ferric sulfate and formamidine disulfide (FDS) to produce a pregnant solution containing metal ions. The method further involves recovering the metal from the pregnant solution. The at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof. The concentration of FDS in the acidic sulfate solution may be in the range of about 0.1 mM to about 15 mM, about 0.1 mM to about 10 mM, about 0.2 mM to about 5 mM, about 0.1 mM to about 2.5 mM, about 0.1 mM to about 2 mM, about 0.1 mM to about 1.5 mM, about 0.1 mM to about 1.0 mM, about 0.1 mM to about 0.5 mM, or about 0.1 mM to about 0.25 mM. Where the metal is a copper sulfide of the formula CuxSy wherein the x:y ratio is between 1 and 2, the copper sulfide may includes chalcocite, djurleite, digenite, or a combination thereof.

The concentration of FDS in the acidic sulfate solution may be sufficient to provide sufficient thiourea to increase the rate of the metal ion extraction relative to an acidic sulfate solution that does not contain the reagent to produce the pregnant solution containing the metal ions.

In the methods described above, wherein the ore may be provided as coarse particles, which may be agglomerated particles. Ferric ions may be used to oxidize the metal sulfide. In the methods described above, the ferric ions may be generated at least in part by bacteria.

The methods may involve a percolation leach. The percolation leach may be a heap leach. The percolation leach may be a vat leach. The leach may be a tank leach.

Recovering metal from the pregnant solution may include solvent extraction and electrowinning.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 23, panel b, is a graph comparing the leaching of copper from covellite (circles) or chalcocite (triangles) using leaching solutions with either an initial concentration of 2 mM Tu (solid symbols) or an initial concentration of 1 m FDS (open symbols);

DETAILED DESCRIPTION

Figure 1:
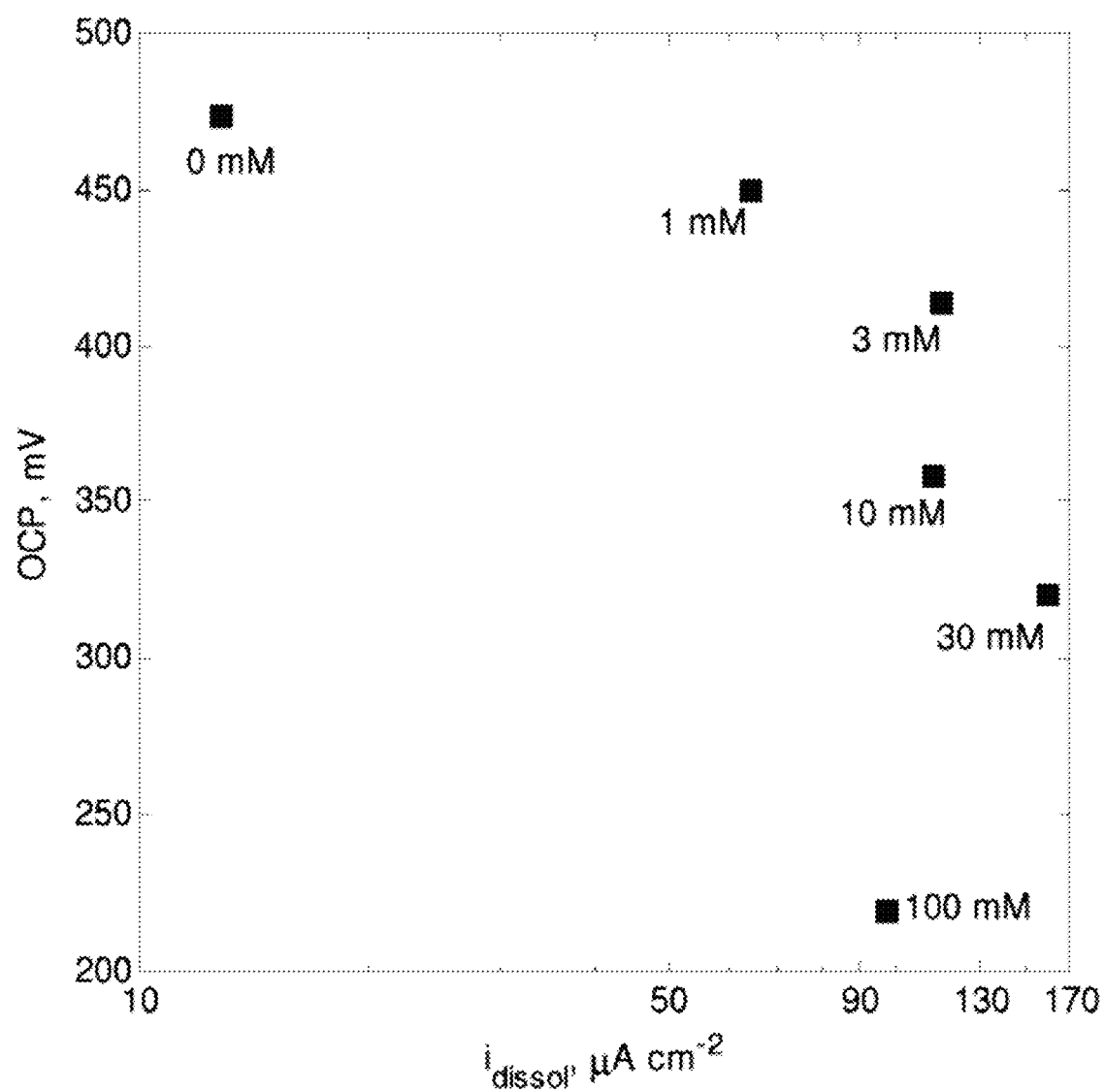
FIG. 1 is a plot showing the effect of thiourea concentration on mixed potential and dissolution current density ($i_{dissol}$) of the $CuFeS_2$ electrode.

This disclosure relates to methods of recovering metal from a metal sulfide mineral, and relates in particular to the unexpected discovery that various reagents having a thiocarbonyl functional group, e.g. thiourea (also known as thiocarbamide), can be used to facilitate the leaching of metal from a metal sulfide mineral with acidic sulfate leach solutions. Such reagents can increase the rate of metal sulfide leaching.

Such methods may be particularly useful in the recovery of metal from low grade ores that do not contain the metal sulfide mineral in high proportions. The method involves contacting the copper sulfide mineral with an acidic sulfate solution containing the reagent having a thiocarbonyl functional group.

Minerals

Chalcopyrite ($CuFeS_2$)

The leaching of chalcopyrite is accomplished in acidic ferric sulfate solution according to the following reaction formula:

$$CuFeS_2 + 4Fe^{3+} \rightarrow Cu^{2+} + 5Fe^{2+} + 2S^0$$

Covellite (CuS)

Leaching of covellite in ferric sulfate solution proceeds according to the following reaction formula:

$$CuS + 2Fe^{3+} \rightarrow Cu^{2+} + 2Fe^{2+} + S^0$$

Chalcocite ($Cu_2S$)

Leaching of chalcocite in ferric solution proceeds according to the following formula:

$$Cu_2S + 2Fe^{3+} \rightarrow Cu^{2+} + 2Fe^{2+} + CuS$$

The skilled person understands that that "chalcocite" ores frequently contain a mixture of minerals with the formula $Cu_xS_y$, where the x:y ratio is between 1 and 2. Additional minerals within this formula include digenite and djurleite.

Bornite ($Cu_5FeS_4$)

Bornite is an important copper mineral that usually coexists with chalcopyrite. The leaching process of bornite in ferric solution is described in two stages:

$$Cu_5FeS_4 + 4Fe^{3+} \rightarrow Cu_3FeS_4 + 2Cu^{2+} + 4Fe^{2+}$$

$$Cu_3FeS_4 + 8Fe^{3+} \rightarrow 3Cu^{2+} + 9Fe_2^{++} + 4S^0$$

Enargite ($Cu_3AsS_4$)

Unlike the other copper minerals mentioned above (chalcopyrite, covellite, charcocite and bornite), the copper in enargite is mainly Cu(II) instead of Cu(I). The difference in copper's oxidation state will also influence its leaching kinetics under catalyzed conditions. Previous study showed that the leaching of enargite at atmospheric pressure is extremely slow. The dissolution of enargite in ferric sulfate media can take various paths. Two of them are described as follows:

$$Cu_3AsS_4 + 20H_2O + 35Fe^{3+} \rightarrow 3Cu^{2+} + AsO_4^{3-} + 4SO_4^{2-} + 40H^+ + 35Fe^{2+}$$

$$Cu_3AsS_4 + 4H_2O + 11Fe^{3+} \rightarrow 3Cu^{2+} + AsO_4^{3-} + 4S^0 + 8H^+ + 11Fe^{2+}$$

Greenockite (CdS)

Cadmium metal and compounds are mainly used for alloys, coatings, batteries and plastic stabilizers. There are no mines specifically for cadmium extraction. Cadmium sulfide is usually associated with zinc sulfides and is recovered as a byproduct of zinc leaching from roasted sulfide concentrates.

Violarite ($FeNi_2S_4$)

Violarite is a nickel (III) sulfide mineral that is usually associated with primary pentlandite nickel sulfide ores.

Reagents

A person skilled in the art will also understand that reagents having a thiocarbonyl functional group include, but are not limited to thiourea (Tu), thioacetamide (TA), sodium-dimethyldithiocarbamate (SDDC), ethylene trithiocarbonate (ETC) and thiosemicarbazide (TSCA).

A non-exhaustive list of additional compounds having a thiocarbonyl functional group is: isothiourea; N—N' substituted thioureas; 2,5-dithiobiurea; dithiobiuret; Thiosemicarbazide purum, Thiosemicarbazide; Methyl chlorothiolformate; Dithiooxamide; Thioacetamide; 2-Methyl-3-thiosemicarbazide; 4-Methyl-3-thiosemicarbazide; Vinylene trithiocarbonate purum; Vinylene trithiocarbonate; 2-Cyanothioacetamide; Ethylene trithiocarbonate; Potassium ethyl xanthogenate; Dimethylthiocarbamoyl chloride; dimethyldithiocarbamate; S,S'-Dimethyl dithiocarbonate; Dimethyl trithiocarbonate; N,N-Dimethylthioformamide; 4,4-Dimethyl-3-thiosemicarbazide; 4-Ethyl-3-thiosemicarbazide; O-Isopropylxanthic acid; Ethyl thiooxamate; Ethyl dithioacetate; Pyrazine-2-thiocarboxamide; Diethylthiocarbamoyl chloride; diethyldithiocarbamate; Tetramethylthiuram monosulfide; Tetramethylthiuram disulfide; Pentafluorophenyl chlorothionoformate; 4-Fluorophenyl chlorothionoformate; O-Phenyl chlorothionoformate; O-Phenyl chlorothionoformate; Phenyl chlorodithioformate; 3,4-Difluorothiobenzamide; 2-Bromothiobenzamide; 3-Bromothiobenzamide; 4-Bromothiobenzamide; 4-Chlorothiobenzamide; 4-Fluorothiobenzamide; Thiobenzoic acid; Thiobenzamide; 4-Phenylthiosemicarbazide; O-(p-Tolyl) chlorothionoformate; 4-Bromo-2-methylthiobenzamide; 3-Methoxythiobenzamide; 4-Methoxythiobenzamide; 4-Methylbenzenethioamide; Thioacetanilide; Salicylaldehyde thiosemicarbazone; Indole-3-thiocarboxamide; S-(Thiobenzoyl)thioglycolic acid; 3-(Acetoxy)thiobenzamide; 4-(Acetoxy)thiobenzamide; methyl N'-[(e)-(4-chlorophenyl)methylidene]hydrazonothiocarbamate; 3-Ethoxythiobenzamide; 4-Ethylbenzene-1-thiocarboxamide; tert-Butyl 3-[(methylsulfonyl)oxy]-1-azetanecarboxylate; Diethyldithiocarbamic acid; 2-(Phenylcarbonothioylthio) propanoic acid; 2-Hydroxybenzaldehyde N-ethylthiosemicarbazone; (1R,4R)-1,7,7-Trimethylbicyclo[2.2.1]heptane-2-thione; Tetraethylthiuram disulfide; Tetraethylthiuram disulfide; 4'-Hydroxybiphenyl-4-thiocarboxamide; 4-Biphenylthioamide; Dithizone; 4'-Methylbiphenyl-4-thiocarboxamide; tetraisopropylthiuram disulfide; Anthracene-9-thiocarboxamide; Phenanthrene-9-thiocarboxamide; Sodium dibenzyldithiocarbamate; and 4,4'-Bis(dimethylamino)thiobenzophenone. Such agents are ready available from, for example, Sigma Aldrich.

Each of Tu, TA, SDDC, ETC and TSCA feature a thiocarbonyl functional group having a sulfur that 1) bears a partial negative charge, 2) bears negative electrostatic potential surface, and 3) has an empty $\pi^*$-antibonding orbital as its lowest unoccupied molecular orbital (LUMO). Accordingly, the skilled person may reasonably expect that other reagents, including those additional reagents listed above, that share such criteria and are sufficiently soluble in water may be useful in the performance of the methods disclosed herein (provided that they do not complex with the metal or iron oxidant to from precipitates). It will be within the purview of the skilled person to identify potentially useful reagents and test them to determine efficacy with any particular ore, if any at all.

For example, Tu has a thiocarbonyl functional group with the sulfur bearing a partial charge of −0.371, a negative electrostatic potential around the Sulfur, and $\pi^*$-antibonding orbital as its LUMO. Hence, thiourea satisfies all three criteria and has demonstrated catalytic effect.

TA has a similar structure as Tu, but with a $CH_3$ side chain instead of $NH_2$. It has a thiocarbonyl functional group with the sulfur bearing a partial charge of −0.305, which is slightly lower than that for Tu, a negative electrostatic potential around the sulfur, and a $\pi^*$-antibonding orbital as its LUMO. Accordingly, TA also satisfies all three criteria and has demonstrated catalytic effect.

ETC differs from Tu and TA as it does not contain any thioamide group. It has a thiocarbonyl functional group with the two sulfur atoms σ-bonded to carbon as the side chain. The sulfur in the thiocarbonyl group bears a partial charge of −0.122, which is much lower than Tu, a negative electrostatic potential around the Sulfur, and $\pi^*$-antibonding orbital as its LUMO. Accordingly, ETC also satisfies all three criteria and has demonstrated catalytic effect.

In comparison, urea has a carbonyl functional group with a C=O bond instead of C=S. The oxygen in the C=O bond bears a partial charge of −0.634 and a negative electrostatic potential around it, which is very similar to the sulfur atom in Tu. However, its LUMO does not contain $\pi^*$-antibonding. Accordingly, urea is not predicted to have a catalytic effect in metal leaching, which is confirmed in respect of chalcopyrite by the results of the stirred reactor experiment shown in FIG. 22.

Carbon disulfide ($CS_2$) contains two thiocarbonyl functional groups. Although the sulfur atoms of each functional group contain a $\pi^*$-antibonding orbitals as their LUMO, they bear a partial positive charge of +0.012. Therefore, $CS_2$ is not predicted to have catalytic effect, which is confirmed in respect of chalcopyrite by the results of the stirred reactor experiment shown in FIG. 23.

Of course, the reagent should also be water soluble. ETC, for example, is only sparingly soluble in water, which may explain why it appears less effective than Tu in leaching copper from chalcopyrite.

Preferentially, the reagent will not form complexes/precipitate with $Fe^{2+}/Fe^{3+}$ ions. TSCA, for example, is able to form a red-color complex with $Fe^{3+}$ in solution, which may explain why it is less effective than Tu in leaching copper from chalcopyrite.

The reagent also should not complex/precipitate with target metal ions such as $Cu^+$, $Cu^{2+}$, $Cd^{2+}$, or $Ni^{2+}$. Dithiooxamide forms an insoluble complex with copper ions and therefore cannot be used for the leaching of copper sulfide minerals, whereas TA complexes with $Cd^{2+}$ ions to form an insoluble complex and therefore cannot be used for leaching cadmium sulfide minerals such as greenockite.

Again, the skilled person will appreciate that not all compounds comprising a thiocarbonyl functional group will be useful in increasing the rate of metal extraction from a metal sulfide. Furthermore, the skilled person will appreciate that a reagent that works to increase the rate of extraction of metal from one metal sulfide may not be useful to increase the rate of extraction of a metal from a different metal sulfide. Again, it will be within the purview of the skilled person to identify potentially useful reagents and test them to determine efficacy with any particular ore, if any at all.

Formamidine Disulfide (FDS)

Formamidine disulfide (FDS) is generated by oxidation of Tu. In the presence of an oxidant such as ferric sulfate, Tu will oxidize partially to formamidine disulfide (FDS) according to the following half-cell reaction:

$$2SC(NH_2)_2 \rightarrow [(NH_2)_2CS]_2^{2+} + 2e^-$$

FDS contains no thiocarbonyl functional group but a sulfur-sulfur sigma bond instead. An equilibrium exists between FDS and Tu in a ferric sulfate solution, such that a leach solution prepared with FDS rather than Tu will provide the Tu necessary for catalysis of the metal sulfide leach. That is, a molecule of FDS will dissociate into two molecules of Tu upon dissolution in the ferric sulfate leach solution. Accordingly, a leaching solution employing Tu as the reagent having the thiocarbonyl functional group may be effectively be prepared using either Tu or FDS.

The skilled person will understand that, due to this equilibrium, the concentration of Tu (and FDS) may fluctuate over time. Accordingly, "concentration" as used herein to refer to the concentration of Tu in the leach solution relates to the amount of Tu present in the solution as if all FDS in the solution was dissociated into Tu (i.e ignoring interconversion between the two forms). Similarly, "concentration" as used herein to refer to the concentration of FDS in the leach solution relates to the amount of FDS present in the solution as if all Tu in the solution was converted into FDS (i.e ignoring interconversion between the two forms).

"Initial concentration" is used herein to refer to the initial concentration of the reagent at the time the leach solution is applied to the ore sample. However, the skilled person will understand that the concentration of the reagent may diminish over time (e.g. through precipitation or decay) as the solution percolates through the column or the heap. Accordingly, the skilled person will appreciate that the processes disclosed herein should work to increase the rate of metal extraction from the metal sulfide provided that the concentration of the reagent is within a suitable range during some portion of the percolation through the ore.

In the presence of FDS and ferric sulphate (or another suitable oxidant), the anodic dissolution of a copper sulfide mineral such as chalcopyrite may proceed according to the following two reactions, with oxidation of the chalcopyrite by either FDS or ferric, respectively:

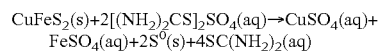

$$CuFeS_2(s) + 2[(NH_2)_2CS]_2SO_4(aq) \rightarrow CuSO_4(aq) + FeSO_4(aq) + 2S^0(s) + 4SC(NH_2)_2(aq)$$

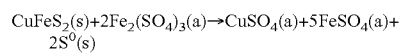

$$CuFeS_2(s) + 2Fe_2(SO_4)_3(a) \rightarrow CuSO_4(a) + 5FeSO_4(a) + 2S^0(s)$$

After chalcopyrite is oxidized, and the copper is leached from the concentrate, it is desirable to recover the copper from the pregnant leach solution.

The methods disclosed herein involve two basic steps, namely, leaching and metal recovery (e.g. by SX-EW). The leaching process may be carried out as a percolation leach (such as a heap leach), a vat leach, or a tank leach as is known in the field.

For the purposes of this disclosure, the words "containing" and "comprising" are used in a non-limiting sense to mean that items following the word are included, but items not specifically mentioned are not excluded. A reference to an element by the indefinite article "a" does not exclude the possibility that more than one of the elements is present, unless the context clearly requires that there be one and only one of these elements.

A "percolation leach", as used herein, refers to the selective removal of a mineral by causing a suitable solvent to seep into and through a mass or pile of material containing the desired soluble mineral, e.g. a column leach or a heap leach.

A "column leach", as used herein, refers to leaching through the use of a long narrow column in which ore sample and solution are in contact for measuring the effects of typical variables encountered in actual heap leaching.

A "heap leach", as used herein, is a process through which metals are extracted from the ore in which they are found, i.e. without beneficiation. A heap leach is often chosen for its efficiency and cost-effectiveness. After being removed from the ground, ore is typically sent through a crusher to break the ore down into smaller particles (although heap ores can be "run-of-mine" in which the ore is leached in an "as-blasted" state with no further crushing). Heap ores may be the product of primary, secondary, or tertiary crushing. Traditionally, the crushed particles are then "heaped", or "stacked" into a large pile.

A persistent cause of failure of heap leach operations is the presence of excess fines in the materials placed on the pad. Excess fines results in a low permeability material and thus the seepage rate of the lixiviant is too slow, or ore-solution contact is insufficient, for economic pad operations. Accordingly, the efficiency of a heap leach may be increased by agglomeration after crushing. "Agglomeration", as used herein, refers to a technique that binds together material fines or particles to create a larger product. Agglomeration may be achieved by different methods known in the art. Typically, heap leach agglomeration is performed in a drum agglomerator with sulfuric acid and no binder, or on conveyor belts with acid sprayed onto the ore at drop points.

The heap is irrigated with a solution that is dependent upon the type of ore being extracted. Acid for the leach will preferably be generated by bacteria using processes known in the art. Alternatively, additional acid could be added as necessary.

The irrigated solution is allowed to percolate through the ore, and drain to the bottom of the heap. The ore pile sits over an impermeable layer, such as plastic sheet, which collects the pregnant leach solution as it drains through and directs it to a collection pond. Once the solution is collected, it is pumped to a recovery plant to extract the copper by solvent extraction and electrowinning (SX-EW).

Applying the methods disclosed herein to a heap leach, ore containing an appropriate sulfide mineral is leached selectively in the presence of the acid sulfate and the reagent having a thiocarbonyl functional group. The concentration of the reagent having a thiocarbonyl functional group in the leach solution may be about 30 mM or perhaps even higher. The skilled person will understand that it is only necessary that the reagent concentration be within a range sufficient to increase the leach rate of the metal sulfide.

Moreover, while the results presented herein indicate that reagent concentrations of about 30 mM or less are sufficiently low to facilitate the leaching of metal from a particular metal sulfide, 30 mM concentrations may not be economically feasible at the present time. Accordingly, it may be preferable to use lower concentrations of reagent that are feasible from economic and operational points of view, e.g. about 20 mM or less, about 10 mM or less, about 5 mM or less, about 4 mM or less, about 3 mM or less, about 2 mM or less, about 1.5 mM or less, about 1 mM or less, about 0.9 mM or less, about 0.8 mM or less, about 0.7 mM or less, about 0.6 mM or less, about 0.5 mM or less, about 0.4 mM or less, 0.3 mM or less, or about 0.2 mM.

Accordingly, the concentration of the reagent in the acidic sulfate solution may in the range of about 0.2 mM to about 0.3 mM, about 0.2 mM to about 0.4 mM, about 0.2 mM to about 0.5 mM, about 0.2 mM to about 0.6 mM, about 0.2 mM to about 0.7 mM, about 0.2 mM to about 0.8 mM, about 0.2 mM to about 0.9 mM, about 0.2 mM to about 1.0 mM, about 0.2 to about 1.5 mM, about 0.2 to about 2.0 mM, about 0.2 to about 2.5 mM, about 0.2 to about 3 mM, about 0.2 to about 4 mM, about 0.2 to about 5 mM, about 0.2 to about 10 mM, about 0.2 to about 20 mM, or about 0.2 to about 30 mM.

The leaching process may be run at temperatures between 0° C. (i.e. the freezing point of water) and 80° C. However, the process would typically be carried out at ambient temperature and atmospheric pressure.

Following the leaching process, copper can be extracted from the leach solution. After a solid-liquid separation, i.e. drainage of the pregnant leach solution containing the copper from the heap, the pregnant solution is preferably subjected to conventional solvent extraction and electrowinning to produce pure copper cathodes according to the following overall reaction:

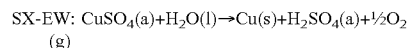

SX-EW: $CuSO_4(a)+H_2O(l) \rightarrow Cu(s)+H_2SO_4(a)+\frac{1}{2}O_2$ (g)

Reagents having a thiocarbonyl functional group in the pregnant leach solution should not present any problem in the electrowinning operation and, as a matter of fact, may even be useful as a leveling agent. Raffinate containing thiourea may then be recirculated to the heap for further leaching. The recirculated leach solution may also be supplemented with thiourea to arrive at the desired initial thiourea concentration for the leach.

EXAMPLES

To facilitate the extraction of metal ions from the minerals listed above, reagents having a thiocarbonyl functional group were added to acidic ferric sulfate solutions as catalysts. In the experiments disclosed herein, it was found that the reagents that contain thiocarbonyl functional groups have positive catalytic effect on the extraction of the minerals. Among all the reagents, Tu consistently provided the highest catalytic performance. Accordingly, Tu was the most heavily studied reagent of those identified. However, the results of experiments with other reagents having thiocarbonyl functional groups are provided to compare their catalytic effects. FDS which does not contain a thiocarbonyl functional group but has comparable catalytic effect as Tu was studied as a special case due to its equilibrium with Tu.

Leaching reactions were carried out at atmospheric pressure on a variety of ore compositions, reagent concentrations, ferric concentrations, and under various other conditions, as described below.

Example 1 Extraction of Copper from Chalcopyrite Using Thiourea

Example 1.1

The effect of thiourea on the electrochemical behavior of a chalcopyrite electrode was studied in a conventional 3-electrode glass-jacketed cell. A $CuFeS_2$ electrode was using as working electrode, a saturated calomel electrode (SCE) was used as reference, and a graphite bar was used as counter-electrode. The $CuFeS_2$ electrode was polished using 600 and 1200 grit carbide paper. All experiments were conducted at 25° C. using a controlled temperature water bath. The electrolyte composition was 500 mM $H_2SO_4$, 20 mM $Fe_2SO_4$ and 0-100 mM thiourea. Before starting any measurement, solutions were bubbled with $N_2$ for 30 minutes to reduce the concentration of dissolved $O_2$. Open circuit potential (OCP) was recorded until changes of no more than 0.1 mV/min were observed. After a steady OCP value was observed, electrochemical impedance spectroscopy (EIS) was conducted at OCP using a 5 mV a.c. sinusoidal perturbation from 10 kHz to 10 mHz. Linear polarization resistance (LPR) tests were also conducted using a scan rate of 0.05 mV/s at ±15 mV from OCP.

Linear potential scans were conducted at electrode potentials ±15 mV from the OCP measured at each thiourea concentration. All scans showed a linear behavior within the electrode potential range analyzed. An increase in the slope of the experimental plots was observed with increasing thiourea concentration. The slope of these curves was used to estimate the value of the polarization resistance ($R_{ct}$) at each concentration. These values were then used to estimate the values of the dissolution current density using equation 1:

$$i_{dissol} \approx \frac{RT}{nFR_{ct}} \qquad \text{Eq. (1)}$$

FIG. 1 shows the effect of thiourea on the dissolution current density and mixed potential of the $CuFeS_2$ electrode, and indicates that a maximum dissolution current density was achieved when thiourea concentration is 30 mM. Increasing thiourea concentration to 100 mM resulted in a decrease in the current density and mixed potential of the $CuFeS_2$ electrode. Moreover, after immersing the $CuFeS_2$ electrode in the 100 mM thiourea solution, a copper-like film was observed on the surface of the electrode, which film could only be removed by polishing the electrode with carbide paper.

Example 1.2

Figure 2:
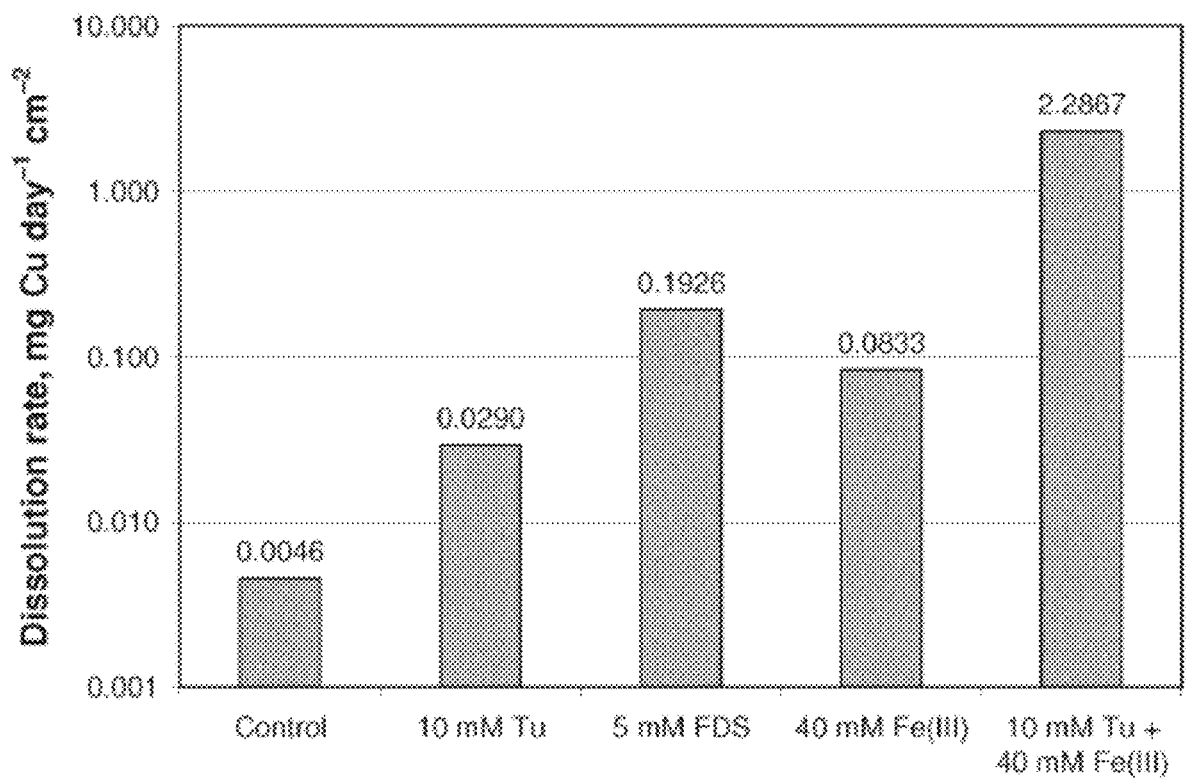
FIG. 2 is a bar graph showing electrochemical dissolution rates of a $CuFeS_2$ electrode in sulfuric acid solution at pH 2 and 25° C. with varying initial concentrations of thiourea, formamidine disulfide (FDS), and Fe(III)

FIG. 2 is a bar graph showing the effect of initial thiourea or FDS concentration on the electrochemical dissolution of a chalcopyrite electrode in sulfuric acid solution at pH 2 and 25° C. A concentration of 10 mM thiourea in the leach solution resulted in a six fold increase in dissolution rate compared to no thiourea, and a concentration of 5 mM FDS resulted in a six fold increase relative to 10 mM thiourea. A concentration of 10 mM thiourea in leach solution also containing 40 mM Fe(III) resulted in a thirty fold increase in dissolution rate compared to 40 mM Fe(III) alone.

Example 1.3

Figure 3:
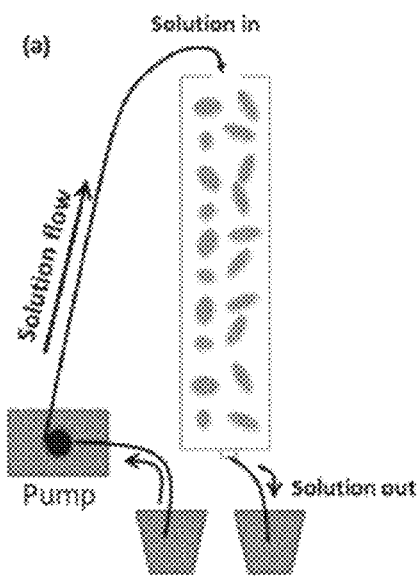
FIG. 3 is a schematic diagram for the leaching column used in respect of the leaching experiments pertaining to FIGS. 4, 5, and 6.

A column leach of different acid-cured copper ores was conducted with thiourea added to the leach solution. A schematic description of the column setup is shown in FIG. 3. The column diameter was 8.84 cm, the column height was 21.6 cm, and the column stack height was 15.9 cm. The irrigation rate was 0.77 mL/min or 8 L/m²/h. The pregnant leach solution emitted from these columns was sampled for copper every 2 or 3 days using Atomic Absorption Spectroscopy (AAS).

The specific mineralogical composition of these ores are provided in Table 1. The Cu contents of Ore A, Ore B, and Ore C were 0.52%, 1.03%, and 1.22% w/w, respectively. Prior to leaching, ore was "acid cured" to neutralize the acid-consuming material present in the ore. That is, the ore was mixed with a concentrated sulfuric acid solution composed of 80% concentrated sulfuric acid and 20% de-ionized water and allowed to sit for 72 hours. For one treatment using Ore C, thiourea was added to the sulfuric acid curing solutions.

The initial composition of the leaching solutions included 2.2 g/L Fe (i.e. 40 mM, provided as ferric sulfate) and pH 2 for the control experiment, with or without 0.76 g/L thiourea (i.e. 10 mM). The initial load of mineral in each column was 1.6 to 1.8 kg of ore. The superficial velocity of solution through the ore column was 7.4 L m$^{-2}$ h$^{-1}$. The pH was adjusted using diluted sulfuric acid. These two columns were maintained in an open-loop or open cycle configuration (i.e. no solution recycle) for the entire leaching period.

Figure 4:
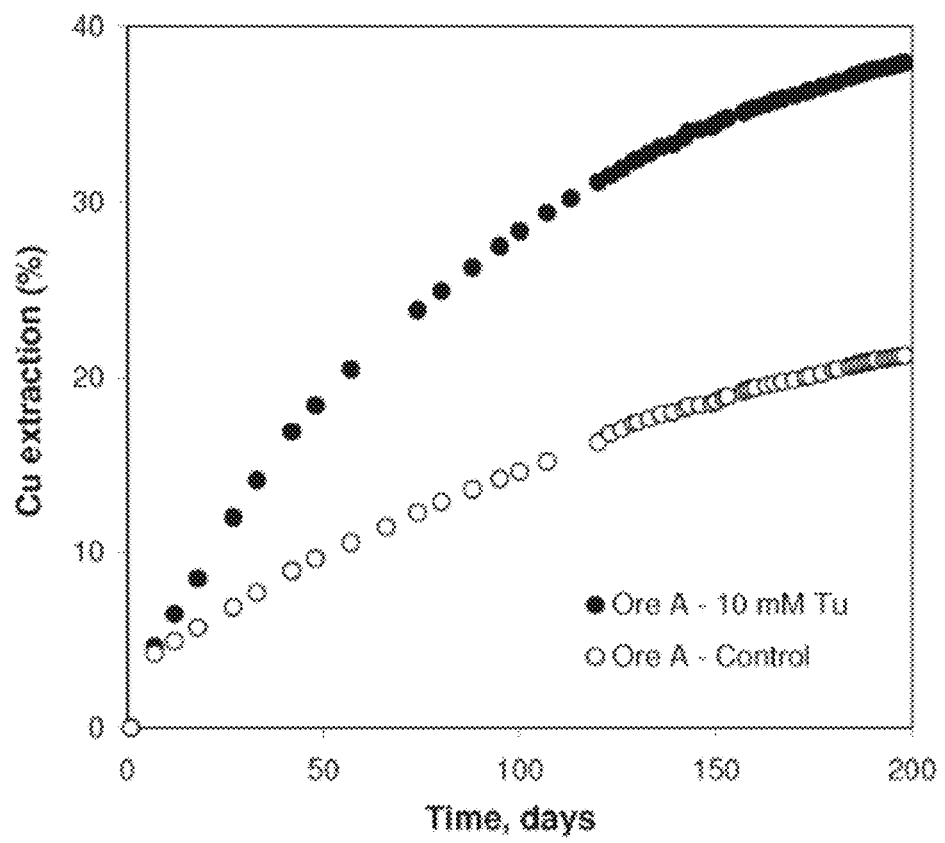
FIG. 4 is a graph showing the effect of thiourea concentration on the leaching of copper from Ore A in column leach experiments.
Figure 5:
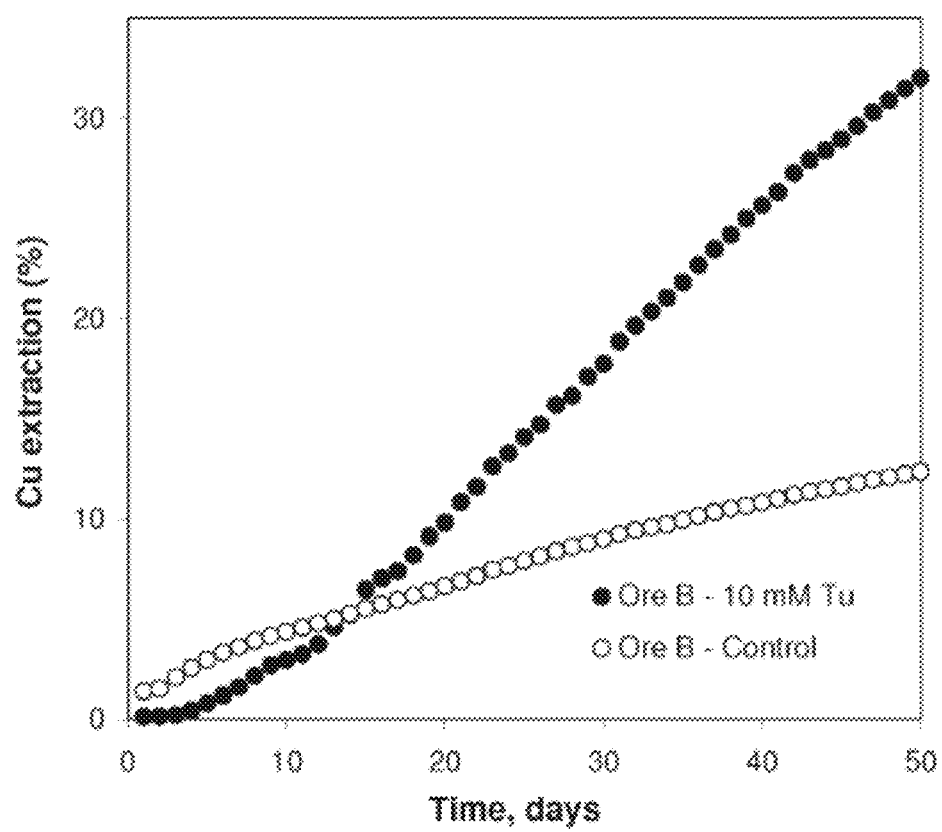
FIG. 5 is a graph showing the effect of thiourea concentration on the leaching of copper from Ore B in column leach experiments.
Figure 6:
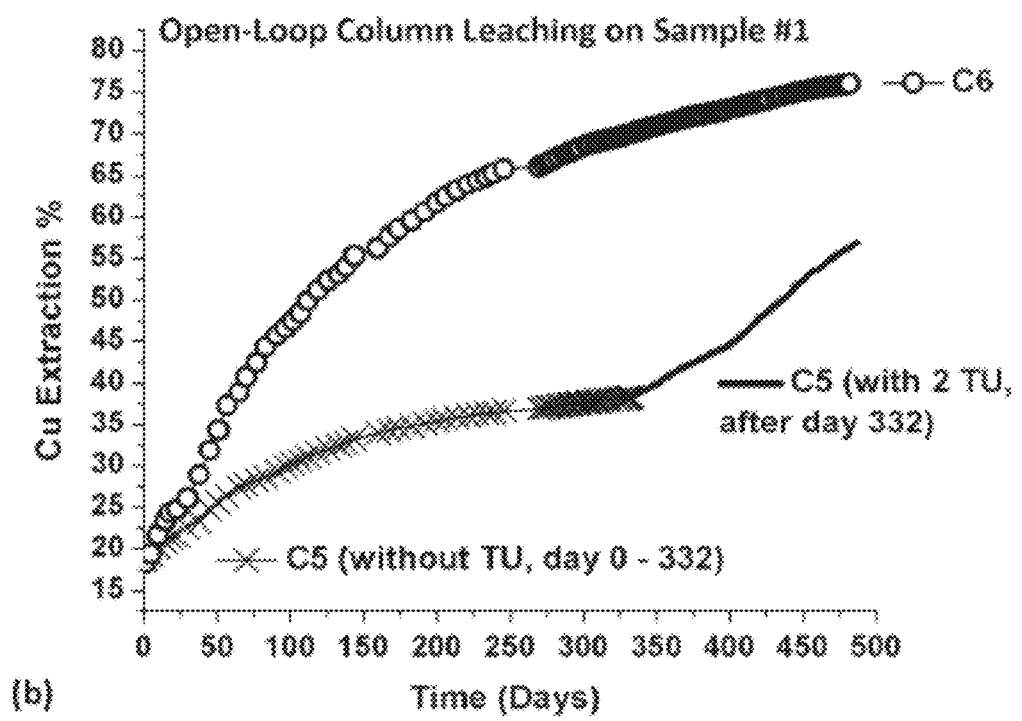
FIG. 6 is a graph showing the effect of thiourea concentration on the leaching of copper from Ore C in column leach experiments.

The results of leaching tests on the Ore A, Ore B and Ore C are shown in FIGS. 4, 5, and 6, respectively. The presence of thiourea in the lixiviant clearly has a positive effect on the leaching of copper from the chalcopyrite. On average, the leaching rate in the presence of thiourea was increased by a factor of 1.5 to 2.4 compared to the control tests in which the leach solutions did not contain thiourea. As of the last time points depicted in FIGS. 4 to 6, copper extractions for columns containing Ore A, Ore B, and Ore C leached with a solution containing sulfuric acid and ferric sulfate alone, without added thiourea, were 21.2% (after 198 days), 12.4% (after 50 days), and 40.6% (after 322 days), respectively. With 10 mM of added thiourea, these extractions were 37.9%, 32.0%, and 72.3%, respectively.

Referring to FIG. 6, 2 mM Tu was added to the leach solution originally containing no Tu from day 322 onward, after which the leach rate increased sharply. From day 332 to day 448, the copper leached from this column increased from 40% to 58%, and rapid leaching was maintained throughout that period.

Figure 7:
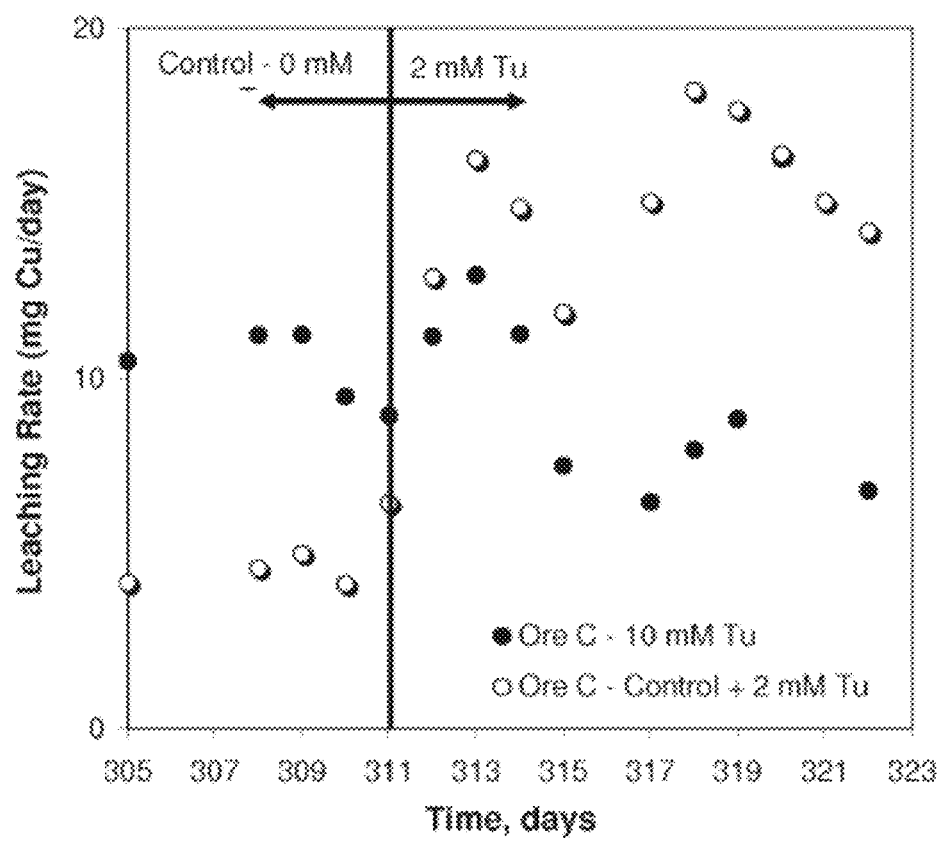
FIG. 7 is a graph showing the effect of thiourea concentration on the leaching rate of copper from Ore C in column leach experiments.

The averages for the last 7 days reported in FIG. 7 indicate that the leaching rate for acid-cured Ore C leached in the presence of 10 mM thiourea is 3.3 higher than for acid-cured Ore C leached in the absence of thiourea, and 4.0 times higher than acid-cured and thiourea-cured Ore C leached in the absence of thioruea.

Figure 8:
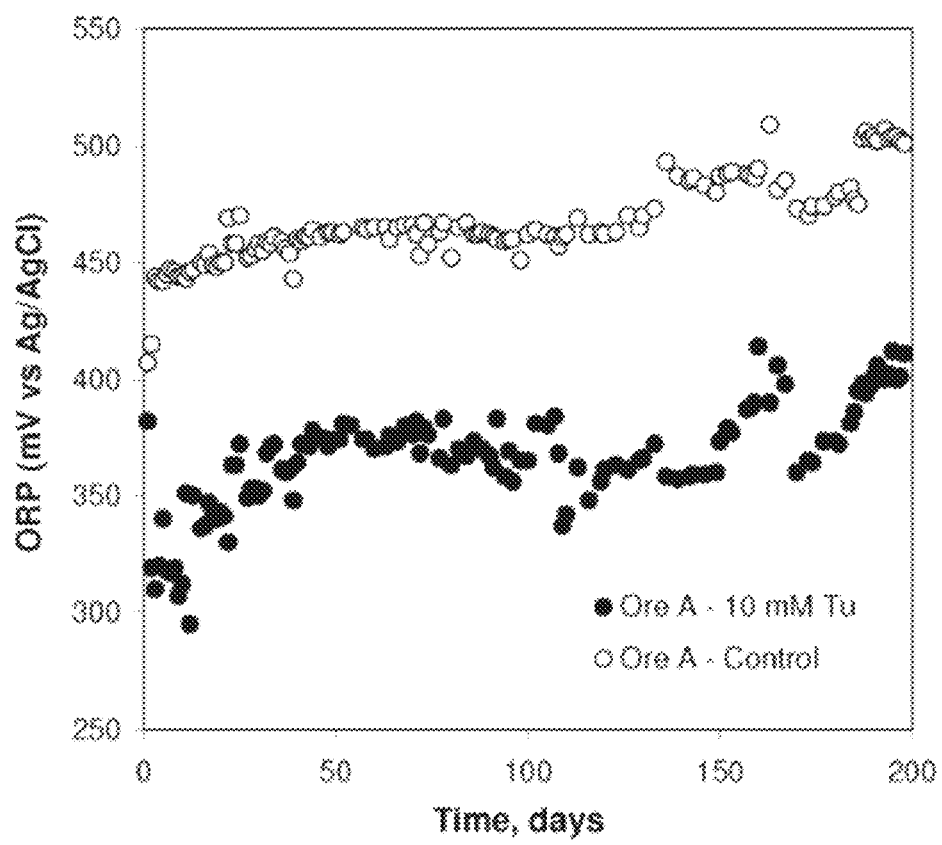
FIG. 8 is a graph showing the effect of thiourea concentration on ORP over time.

FIG. 8 shows the effect of Tu on solution potential. All potentials are reported against a Ag/AgCl (saturated) reference electrode. The solution potential of the leach solutions containing thiourea was generally between 75 and 100 mV lower than the solution potential of leach solution that did not include thiourea. Lower solution potentials are consistent with thiourea working to prevent the passivation of chalcopyrite.

Example 1.4 Bottle Roll Leaching

"Bottle roll" leaching experiments in the presence of various concentrations of thiourea were conducted for coarse Ore A and Ore B. The tests were conducted using coarsely crushed (100% passing ½ inch) ore.

Prior to leaching, the ore was cured using a procedure similar to what was performed on the ore used in the column leaching experiments. The ore was mixed with a concentrated sulfuric acid solution composed of 80% concentrated sulfuric acid and 20% de-ionized water and allowed to settle for 72 hours to neutralize the acid-consuming material present in the ore. For several experiments, different concentrations of thiourea were added to the ore using the sulfuric acid curing solutions.

The bottles used for the experiments were 20 cm long and 12.5 cm in diameter. Each bottle was loaded with 180 g of cured ore and 420 g of leaching solution, filling up to around one third of the bottle's volume.

The leaching solution from each bottle was sampled at 2, 4, 6 and 8 hours, and then every 24 hours thereafter. Samples were analyzed using atomic absorption spectroscopy (AAS) for their copper content.

The conditions for the bottle roll experiments are listed in Table 2. Experiments #1 to #6 were conducted using only the original addition of thiourea into the bottles. For experiments #7 to #11, thiourea was added every 24 hours to re-establish the thiourea concentration.

A positive effect of thiourea on copper leaching was observed. For the coarse ore experiments, a plateau was not observed until after 80 to 120 hours. Thiourea was added periodically to the coarse ore experiments, yielding positive results on copper dissolution.

Figure 9:
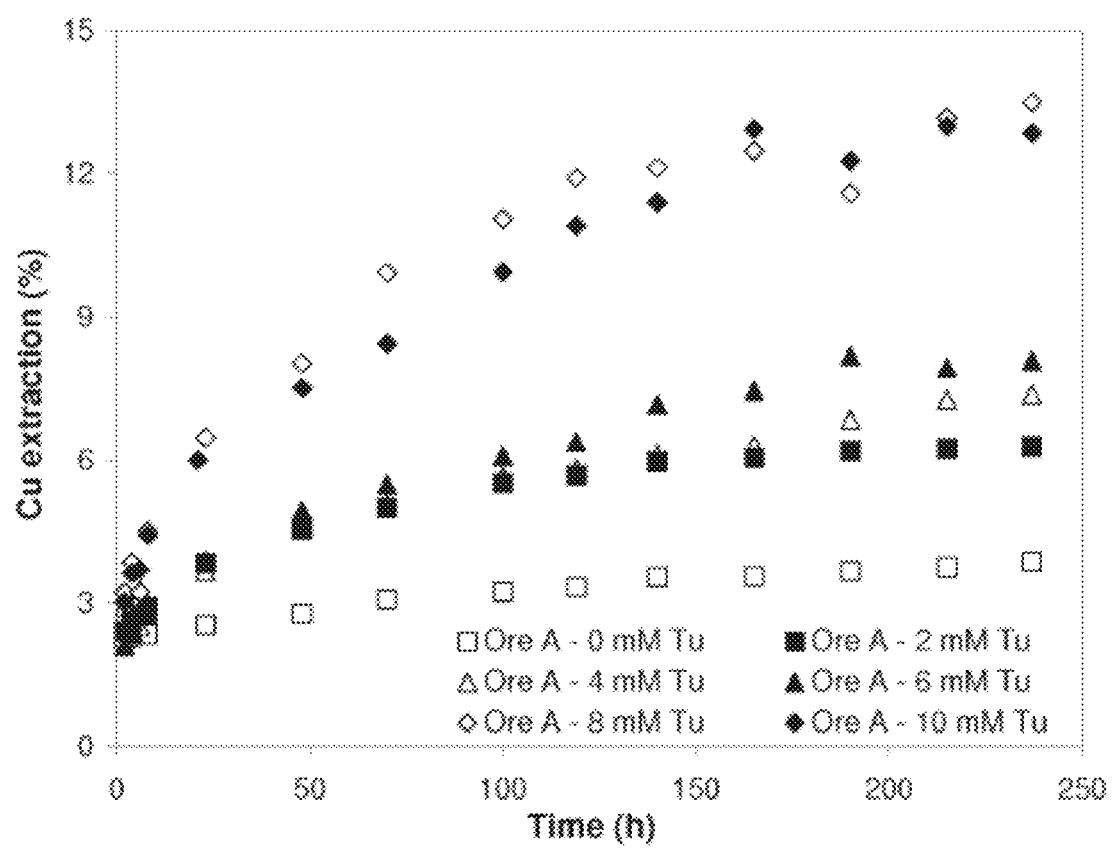
FIG. 9 is a graph showing the effect of thiourea concentration on copper dissolution for coarse Ore A in bottle roll experiments.
Figure 10:
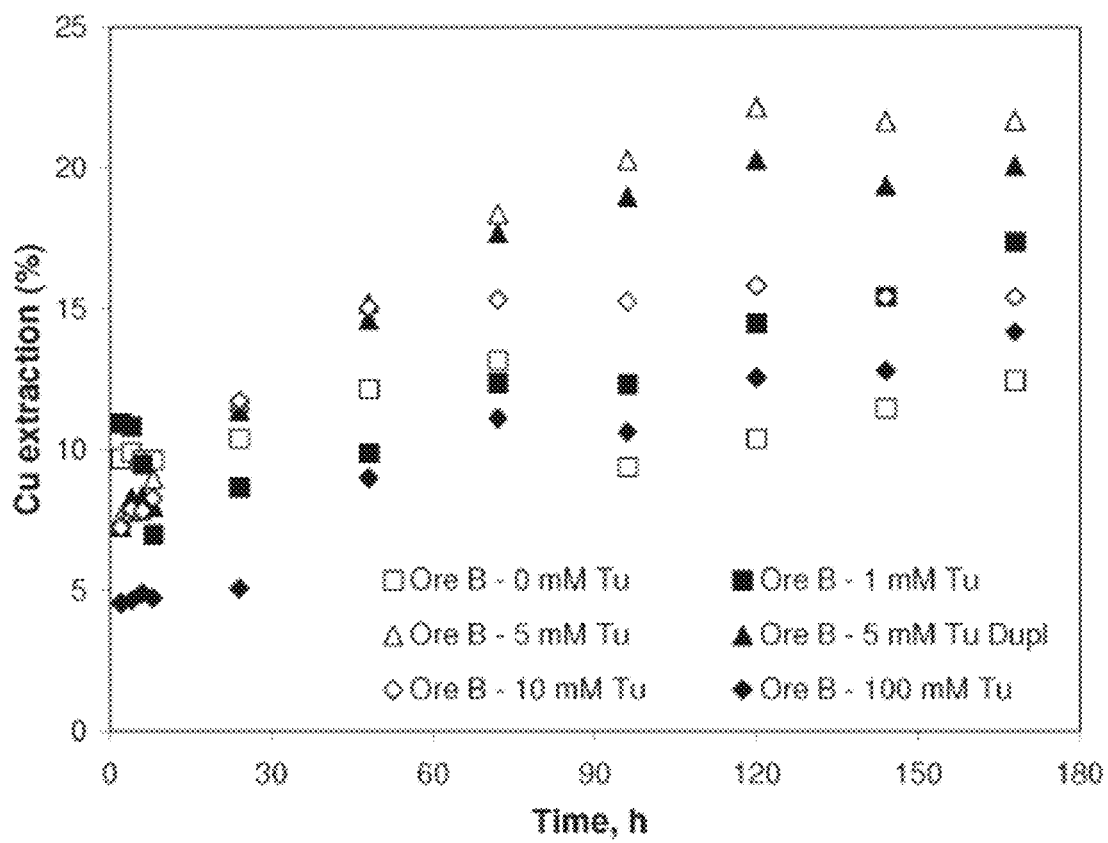
FIG. 10 is a graph showing the effect of thiourea concentration on copper dissolution for coarse Ore B in bottle roll experiments.

The effect of different concentrations of thiourea in the leach solution on the leaching of coarse ore (experiments #1 to #11 as described in Table 2) is shown in FIGS. 9 and 10.

For ore B, thiourea was periodically added every 24 hours to re-establish the thioruea concentration in the system and thus better emulate the conditions in the column leach experiments. As may be observed from FIG. 9, 8 mM and 10 mM thiourea yielded higher copper dissolution results than the other thiourea concentrations tested for ore A. A plateau in dissolution is not observed until after approximately 120 hours, which varied with thiourea concentration as shown in FIG. 9.

TABLE 1

| Mineral | Ideal Formula | Ore A | Ore B | Ore C |
|---|---|---|---|---|
| Actinolite | $Ca_2(Mg, Fe^{2+})_5Si_8O_{22}(OH)_2$ | — | 1.8 | — |
| Biotite | $K(Mg, Fe^{2+})_3AlSi_3O_{10}(OH)_2$ | — | 4.2 | — |
| Calcite | $CaCO_3$ | — | 19.3 | — |
| Chalcopyrite | $CuFeS_2$ | 1.4 | 3.5 | 2.6 |
| Clinochlore | $(Mg, Fe^{2+})_5Al(Si_3Al)O_{10}(OH)_8$ | — | 15.0 | — |
| Diopside | $CaMgSi_2O_6$ | — | 3.5 | — |
| Galena | $PbS$ | — | — | 0.1 |
| Gypsum | $CaSO_4 2H_2O$ | — | 1.2 | — |
| Hematite | $\alpha\text{-}Fe_2O_3$ | — | 0.2 | — |
| K-feldspar | $KAlSi_3O_8$ | 17.9 | 10.8 | — |
| Kaolinite | $Al_2Si_2O_5(OH)_4$ | 2.3 | — | 2.3 |
| Magnetite | $Fe_3O_4$ | — | 0.8 | — |
| Molybdenite | $MoS_2$ | <0.1 | — | — |
| Muscovite | $KAl_2AlSi_3O_{10}(OH)_2$ | 21.9 | 6.0 | 41.6 |
| Plagioclase | $NaAlSi_3O_8$—$CaAlSi_2O_8$ | 13.6 | 25.4 | — |
| Pyrite | $FeS_2$ | 2.3 | — | 8.0 |
| Quartz | $SiO_2$ | 40.0 | 8.3 | 44.4 |
| Rutile | $TiO_2$ | 0.5 | — | 0.9 |
| Siderite | $Fe^{2+}CO_3$ | — | 0.1 | — |
| Total | | 100 | 100 | 100 |

As may be observed from FIG. 9, 5 mM thiourea yielded higher copper dissolution results than the other thiourea concentrations tested for ore B. As with ore A, a plateau in dissolution is not observed until after approximately 80 to 120 hours, which varied with thiourea concentration as shown in FIG. 9. Periodic addition of thiourea resulted in increased copper dissolutions and produced a delay in the dissolution plateau.

Interestingly, solutions containing 100 mM thiourea did not appear to be much more effective on copper extraction than those containing no thiourea, and even worse at some time points. This is consistent with the results of Deschênes and Ghali, which reported that solutions containing ~200 mM thiourea (i.e. 15 g/L) did not improve copper extraction from chalcopyrite. Thiourea is less stable at high concentrations and decomposes. Accordingly, it is possible that, when initial thiourea concentrations are somewhat higher than 30 mM, sufficient elemental sulfur may be produced by decomposition of thiourea to form a film on the chalcopyrite mineral and thereby assist in its passivation. It is also possible that, at high Tu dosages, some copper precipitates from solution (e.g. see FIG. 15) to account for some of the low extraction results.

Example 2 Extraction from Chalcopyrite, Covellite, Chalcocite, Bornite, Enargite, Pentlandite, Violarite, and Greenockite Using Thiourea The catalytic effect of Tu was further demonstrated in stirred reactor tests. All reactors contained 1.9 L of ferric sulfate solution at pH 1.8 and total iron concentration of 40 mM. 1 g of mineral samples was used in each reactor test. These experimental conditions were designed to maintain an unlimited supply of oxidant.

In order to demonstrate the catalytic effect on chalcopyrite, 100% pure synthetic chalcopyrite was used instead of chalcopyrite concentrate which contains various impurities. The chalcopyrite was synthesized via a hydrothermal approach. $CuCl$, $FeCl_3$ and thiourea were first mixed with a molar ratio of 1:1:2 and dissolved in 150 mL DI water. The solution was transferred to a Teflon-lined reaction vessel and heated up to 240° C. for 24 hours. At the end of the reaction, the precipitated powder was washed with acidic water (pH=1) and dried in air at room temperature. XRD analysis in showed that the synthetic chalcopyrite was free of any impurities compared with chalcopyrite mineral concentrate. This synthetic chalcopyrite was used in all the tests carried out in stirred reactors as disclosed herein.

The covellite mineral used in the experiment disclosed herein was also synthesized via a hydrothermal approach. CuCl and Tu were mixed with a molar ratio of 1:1 and dissolved in 150 mL DI water. The solution was transferred to a Teflon-lined reaction vessel and heated up to 220° C. for 24 hours. The synthesized CuS was acid-washed and dried in air. XRD analysis showed that it had 100% purity with no interference of other species.

The chalcocite mineral sample used in the experiments disclosed herein was 100% pure natural mineral.

The bornite mineral used in the experiments disclosed herein was obtained from Butte, Mont. with copper content of 58.9% based on ICP-AES. XRD analysis showed that the mineral contains 76.8% bornite, 8.1% chalcopyrite, 6.3% pyrite, 5.8% tennatite and 3.0% enargite. The copper content calculated from XRD was 55.6%, which is relatively consistent with the chemical assay.

The enargite mineral used in the experiments disclosed herein was in the form of an enargite concentrate, which contained approximately 70% enargite (34% copper) according to XRD analysis.

The Greenockite mineral used in this experiment was synthesized via a hydrothermal approach. $CdCl_2$ and thiourea were mixed with a molar ratio of 1:1 and dissolved in 100 mL DI water. The solution was transferred to a Teflon-lined reaction vessel and heated up to 150° C. for 24 hours. The synthesized CdS was acid-washed and dried in air. XRD analysis showed that it has 100% purity with no interference of other species.

TABLE 2

List of bottle roll leaching experiments involving Ore A and Ore B.

| Experiment | Brief description of experimental conditions |
|---|---|
| #1 | Coarse ore A, 0 mM Tu in solution, 40 mM ferric in solution, acid curing, no Tu replenishment |
| #2 | Coarse ore A, 2 mM Tu in solution, 40 mM ferric in solution, acid curing, no Tu replenishment |
| #3 | Coarse ore A, 4 mM Tu in solution, 40 mM ferric in solution, acid curing, no Tu replenishment |
| #4 | Coarse ore A, 6 mM Tu in solution, 40 mM ferric in solution, acid curing, no Tu replenishment |

TABLE 2-continued

List of bottle roll leaching experiments involving Ore A and Ore B.

| Experiment | Brief description of experimental conditions |
|---|---|
| #5 | Coarse ore A, 8 mM Tu in solution, 40 mM ferric in solution, acid curing, no Tu replenishment |
| #6 | Coarse ore A, 10 mM Tu in solution, 40 mM ferric in solution, acid curing, no Tu replenishment |
| #7 | Coarse ore B, 0 mM Tu in solution, 40 mM ferric in solution, acid curing |
| #8 | Coarse ore B, 1 mM Tu in solution, 40 mM ferric in solution, acid curing, periodic addition of Tu to replenish 1 mM concentration in solution |
| #9 | Coarse ore B, 5 mM Tu in solution, 40 mM ferric in solution, acid curing, periodic addition of Tu to replenish 5 mM concentration in solution |
| #10 | Coarse ore B, 10 mM Tu in solution, 40 mM ferric in solution, acid curing, periodic addition of Tu to replenish 10 mM concentration in solution |
| #11 | Coarse ore B, 100 mM Tu in solution, 40 mM ferric in solution, acid curing, periodic addition of Tu to replenish 100 mM concentration in solution |

The violarite used in the experiments disclosed herein was natural violarite mineral that contains 15.8% Ni according to ICP-AES. XRD analysis showed that the mineral had approximately 42% violarite and 13.1% $NiSO_4 \cdot 6H_2O$.

Figure 11:
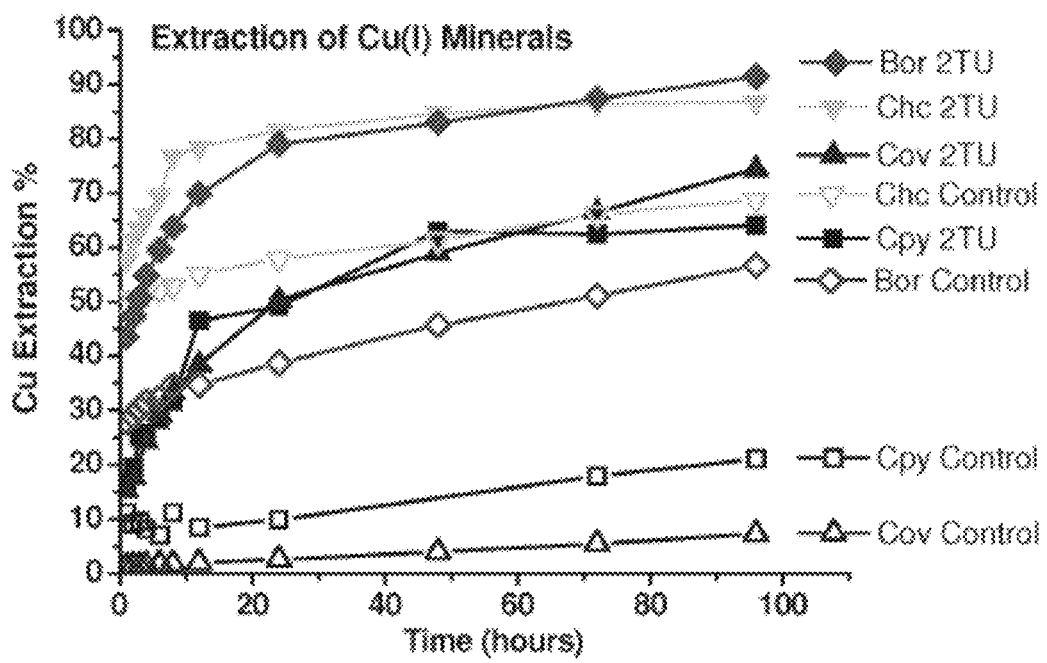
FIG. 11 is a graph showing the effect of Tu addition on various minerals that contain Cu(I). Diamonds pertain to bornite, triangles refer to covellite, inverted triangles pertain to chalcocite, and squares pertain to chalcopyrite. Open symbols refer to control treatments without Tu, whereas solid symbols refer to minerals treated solutions having an initial Tu concentration of 2 mM.

The sulfur on thiocarbonyl groups contains a lone electron pair and a filled π-orbital which can be used for donor-acceptor type bonding with a transition metal, together with a π*-antibonding orbital that could potentially accept the back-donation of electrons from the filled d-orbitals on the transition metal. Accordingly, without wanting to be bound by theory, it is suspected that the interaction between the surface ion and the thiocarbonyl functional group, especially back donation from metal to ligand, is responsible for the catalytic effect. Moreover, it is suspected that the catalytic effect should be more pronounced for the transition metals with higher d-electron numbers, with the catalytic effect being most pronounced for minerals with $d^{10}$ electronic configuration FIG. 11 shows that Tu catalyzes the leaching of common copper sulfide minerals, including chalcopyrite, covellite, chalcocite, and bornite, which all contain Cu(I). After 96 hours of leaching, chalcopyrite extraction reaches 64.1% with 2 mM of Tu compared to 21.1% without Tu; covellite extraction reaches 74.4% with 2 mM of Tu compared to 7.2% without Tu; chalcocite extraction reaches 85.6% with 2 mM of Tu compared to 65.1% without Tu; bornite extraction reaches 91.4% with 2 mM of Tu compared to 56.7% without Tu.

Figure 12:
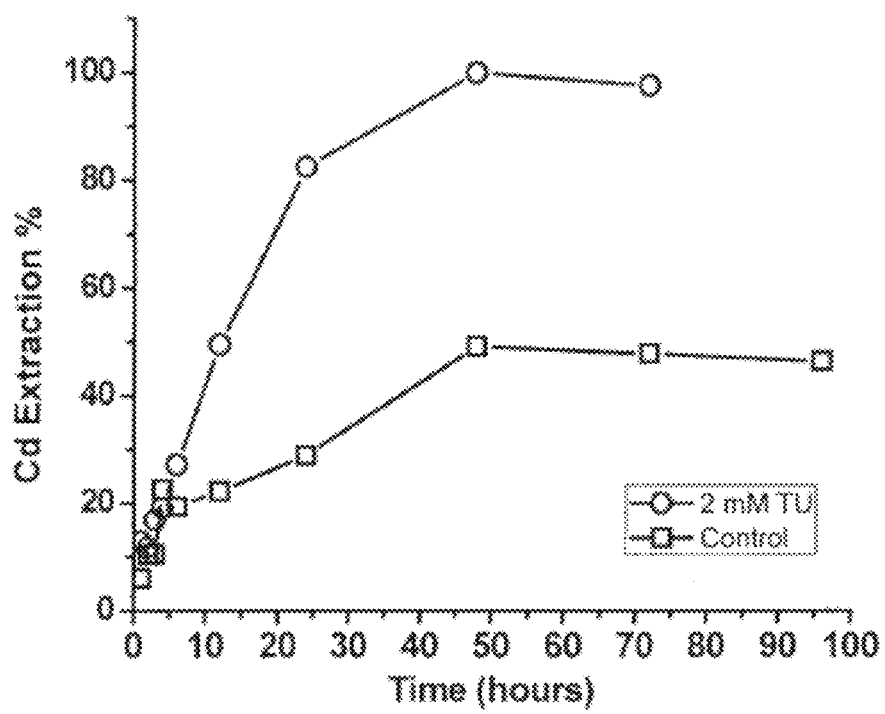
FIG. 12 is a graph showing the effect of Tu on cadium extraction from greenockite.

Like Cu(I), Cd(II) also contains the $d^{10}$ electronic configuration. FIG. 12 shows that leaching of CdS mineral is significantly enhanced with the addition of Tu. With Tu, the extraction of cadmium reaches 100% at 48 hours whereas extraction in the noncatalyzed reaction plateaued at 47% after 96 hours.

Figure 13:
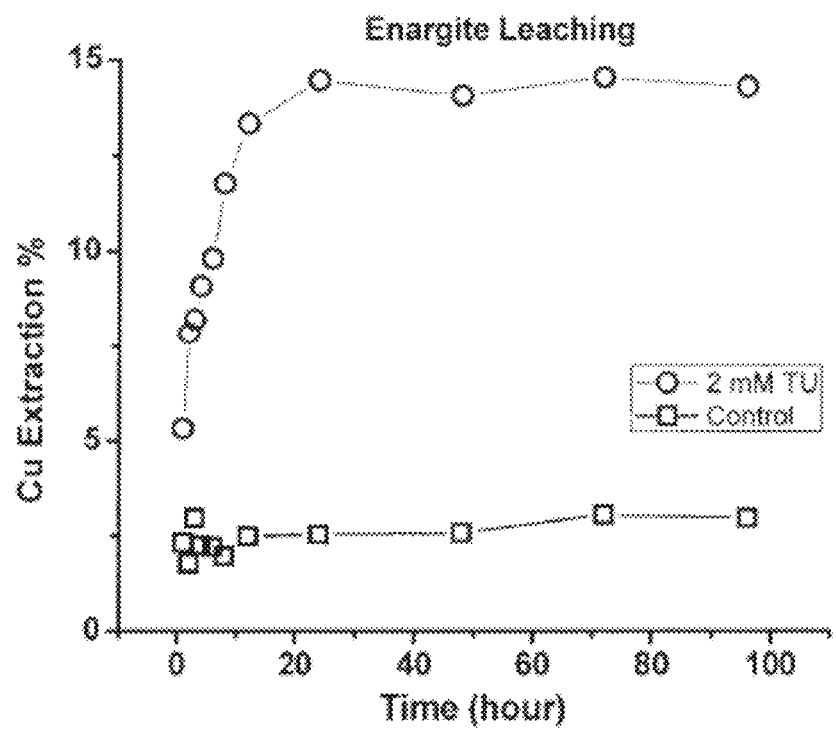
FIG. 13 is a graph showing the effect of Tu on copper extraction from enargite.

The copper ion in the enargite mineral has fewer d-electrons than other primary and secondary sulfides, and thus it may be expected that the catalytic effect should be slower than that for Cu(I) minerals. Nevertheless, the results shown in FIG. 13 clearly demonstrate that leaching with a leach solution comprising an initial concentration of 2 mM Tu increases the leach rate of copper from enargite compared to a control without Tu, which did not show any significant extraction after 96 hours of leaching.

Figure 14:
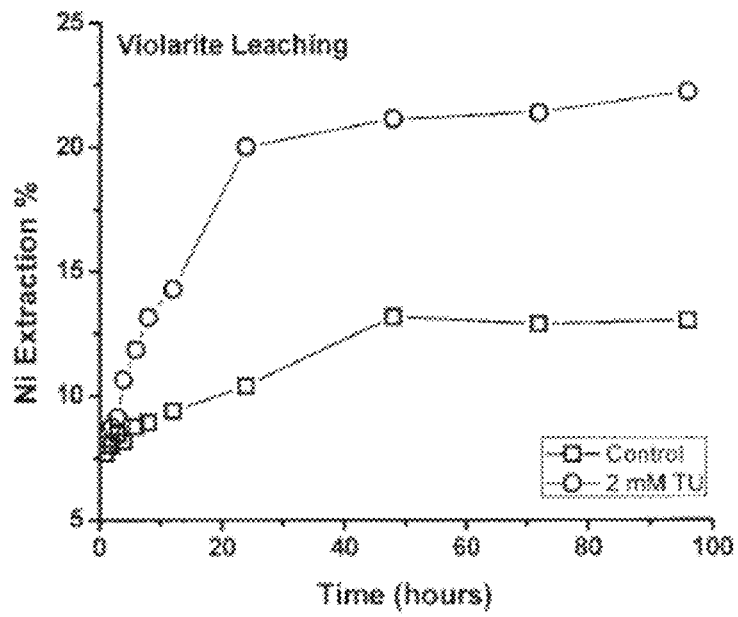
FIG. 14 is a graph showing the effect of Tu on nickel extraction from violarite.

Minerals that contain transition metal ions with $d^7$ electronic configuration, such as Ni(III), may also undergo catalyzed leaching with the addition of Tu. Similar to Cu(II), as Ni(III) is the highest stable oxidation state with 7 d-electrons, the catalytic effect is not expected to be as dramatic as for $d^{10}$ minerals. Referring to FIG. 14, leaching with a leach solution comprising an initial concentration of 2 mM Tu increases the leach rate of nickel from violarite compared to a control without Tu.

Results of leaching experiments referred to in Example 2 are summarized in Table 3, in which the extraction percentages under non-catalyzed and catalyzed conditions (with an initial Tu concentration of 2 mM) are compared.

TABLE 3

Comparisons of reactor leaching for various minerals under uncatalyzed and 2 mM Tu catalyzed conditions

| Mineral | 96-Hour Extraction (No thiourea) | 96-Hour Extraction (2 mM thiourea) |
|---|---|---|
| Chalcopyrite, $CuFeS_2$ | 21.1% | 64.1% |
| Covellite, CuS | 6.8% | 74.4% |
| Chalcocite, $Cu_2S$ | 65.1% | 85.5% |
| Bornite, $CuFeS_4$ | 56.7% | 91.4% |
| Greenokite, CdS | 46.5% | 100.0% |
| Enargite, $Cu_3AsS_4$ | 2.1% | 10.0% |
| Violarite, $FeNi_2S_4$ | 13.0% | 22.2% |

Example 3 Reagent Dosage

Figure 15:
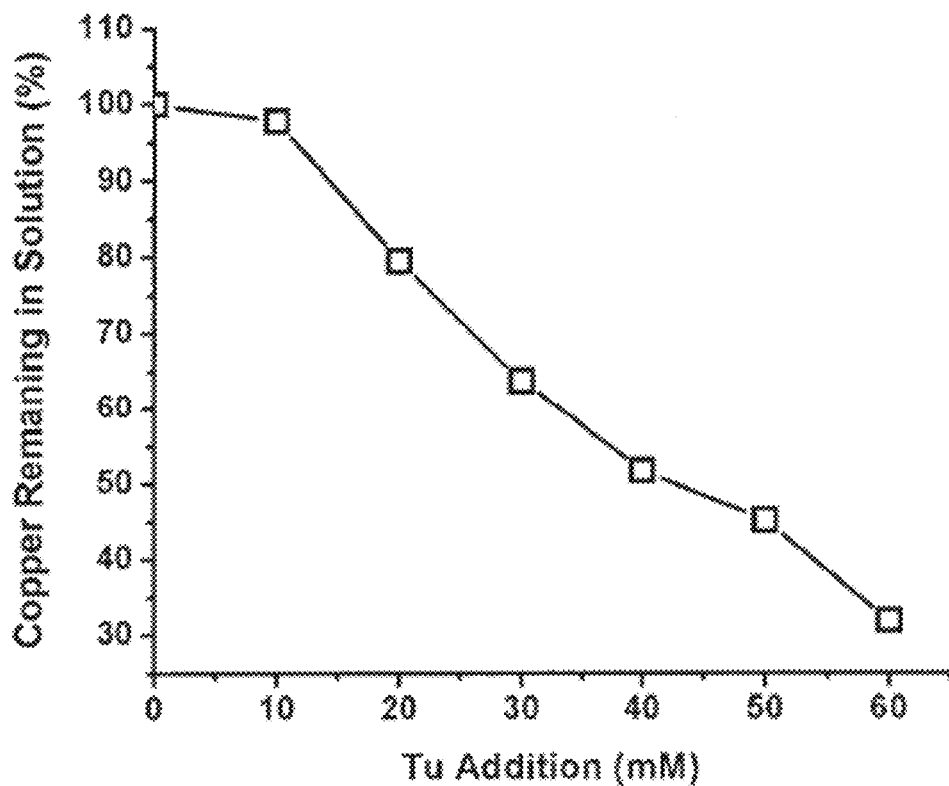
FIG. 15 is a graph showing the percentage of Cu ions remaining in solution after various amounts of Tu addition.

Optimum dosage of reagent may increase the efficiency of leaching. First, at certain concentrations, the reagent may form an insoluble complex with the metal ion of interest and precipitate. For example, Tu can form an insoluble complex with Cu(I) ions at a 3:1 molar ratio. A precipitation test was performed to examine the concentration range at which Cu-Tu complex precipitation may occur. 20 mL of Cu solution was divided into several identical portions followed by the addition of various Tu dosage (i.e. 0 to 60 mM). The solution was stirred for 24 hours, and the Cu remaining in the solution phase was analyzed by AAS. The results are shown in FIG. 15, plotted as the percentage of Cu remaining.

Second, heap leaching of metal sulfides is based on a bioleaching mechanism, an excessive amount of reagent may be detrimental to bioleaching microbes. For example, bacteria commonly used for bioleaching, such as *Acidithiobacillus ferrooxidans* and *Acidithiobacillus thiooxidans*, have very slow growth in a solution containing 10 mM Tu, and cannot survive at 100 mM Tu.

Third, with respect to Tu specifically, ferric reacts with Tu and converts it to FDS (see *Hydrometallurgy* 28, 381-397 (1992)). Although the reaction is reversible under certain conditions, a high concentration of FDS tends to decompose irreversibly into cyanamide and elemental sulfur (see *J Chromatogr* 368, 444-449).

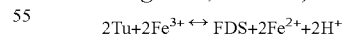

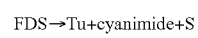

Therefore, over-addition of Tu in the lixiviant may cause the loss of $Fe^{3+}$ and Tu due to oxidation and decomposition. The irreversible decomposition of FDS has been observed when adding 4 mM of Tu into a 40 mM ferric sulfate solution at pH 1.8.

To further investigate the effect of Tu dosage on copper extraction, stirred reactor tests were performed using 1 g of synthetic chalcopyrite in 1.9 L of 40 mM ferric sulfate solution at pH 1.8 with various initial Tu concentrations. The treatments were run for 172 hours to approach maximum extraction. The results are presented in FIG. 16, and shows that, for 1 g of chalcopyrite, higher Tu dosage results in faster leaching kinetics among the Tu concentrations tested.

Figure 16:
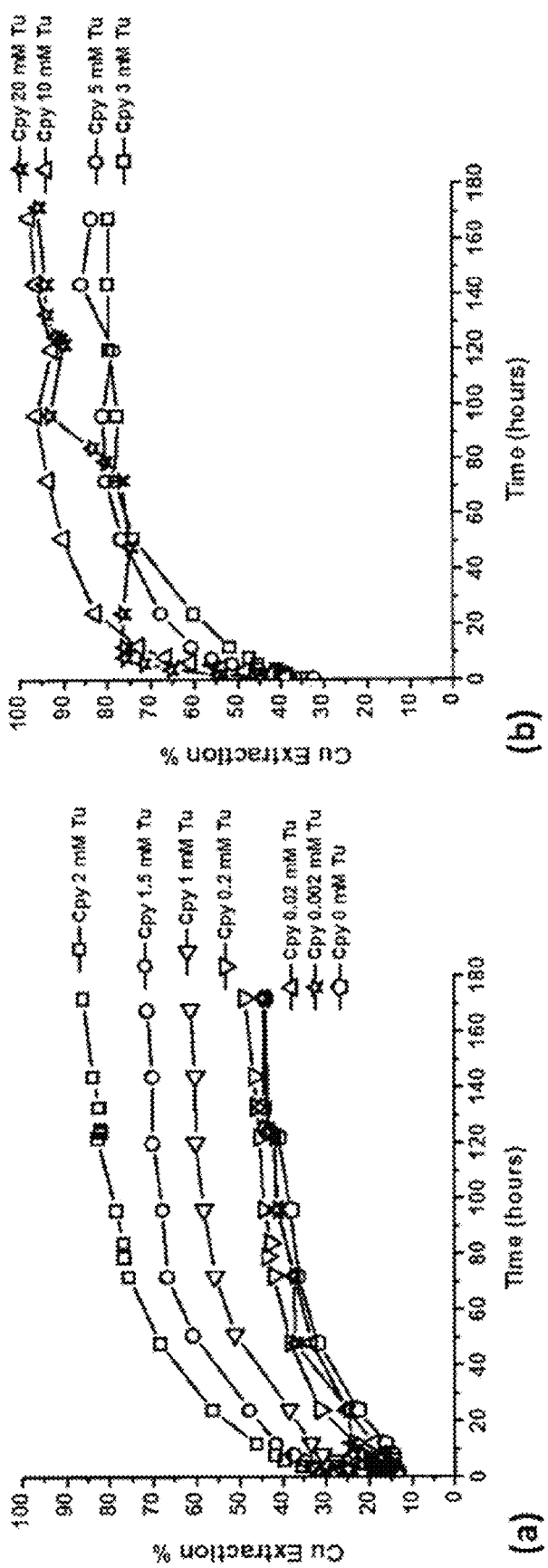
FIG. 16 is a graph showing extraction of Cu from chalcopyrite under various Tu dosages.

For Tu dosages of 5 mM and under, the initial 40 mM ferric sulfate solution can be considered as a sufficient supply of oxidant. However, for higher dosages such as 10 mM and 20 mM of Tu, extra ferric (in 1:1 ratio with Tu) had to be added to the solution to allow the oxidation of Tu to FDS. For 10 mM Tu, an extra 10 mM of $Fe^{3+}$ was added at time zero. For 20 mM Tu, an extra 20 mM of $Fe^{3+}$ was added at 72 hours, which led to the continuation of extraction as shown in FIG. 16.

Figure 17:
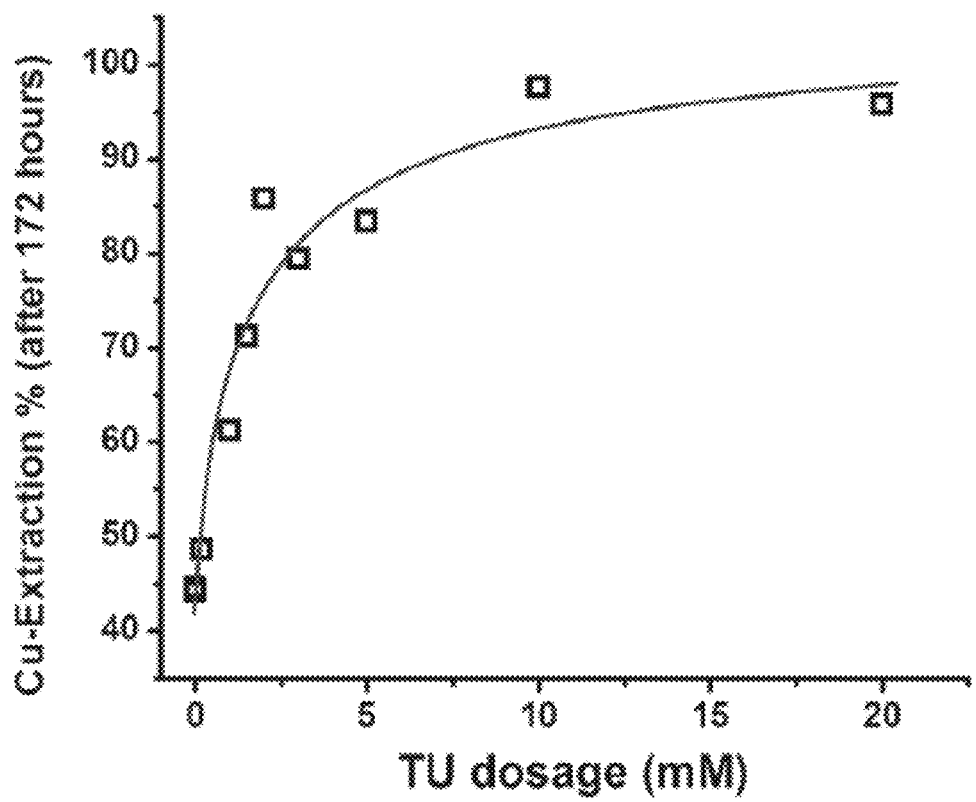
FIG. 17 is a graph showing the relationship between Tu dosage and Cu extraction after 172 hours.
Figure 18:
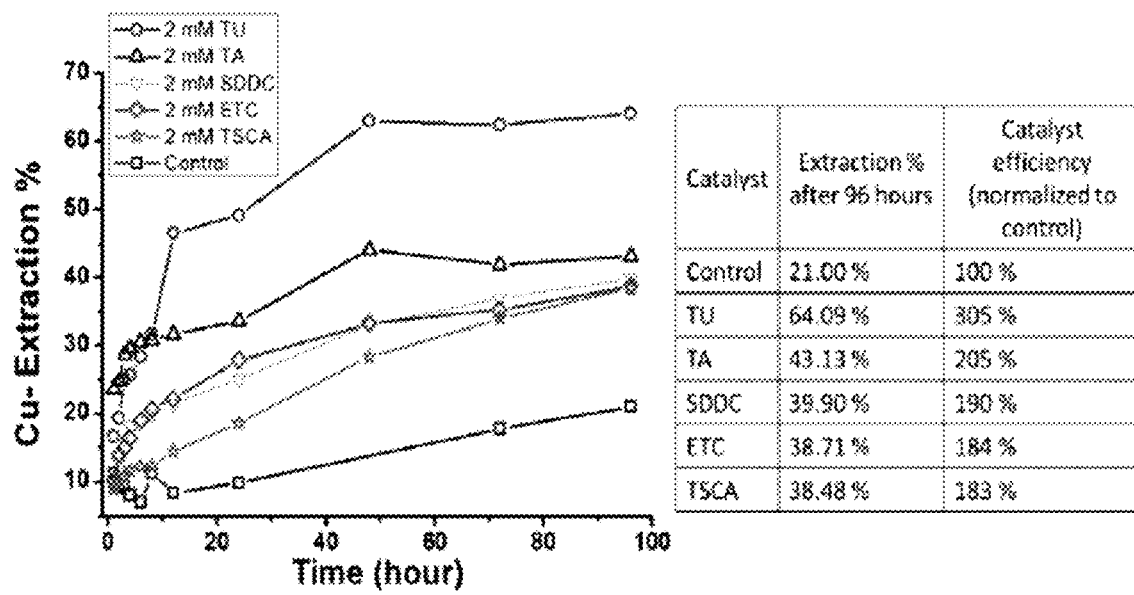
FIG. 18 is a graph showing leaching of copper from chalcopyrite in stirred reactor tests using reagents comprising thiocarbonyl functional groups. Circles pertain to Tu, triangles pertain to TA, inverted triangles pertain to SDDC, diamonds pertain to ETC, stars pertain to TSCA, and squares pertain to controls.
Figure 19:
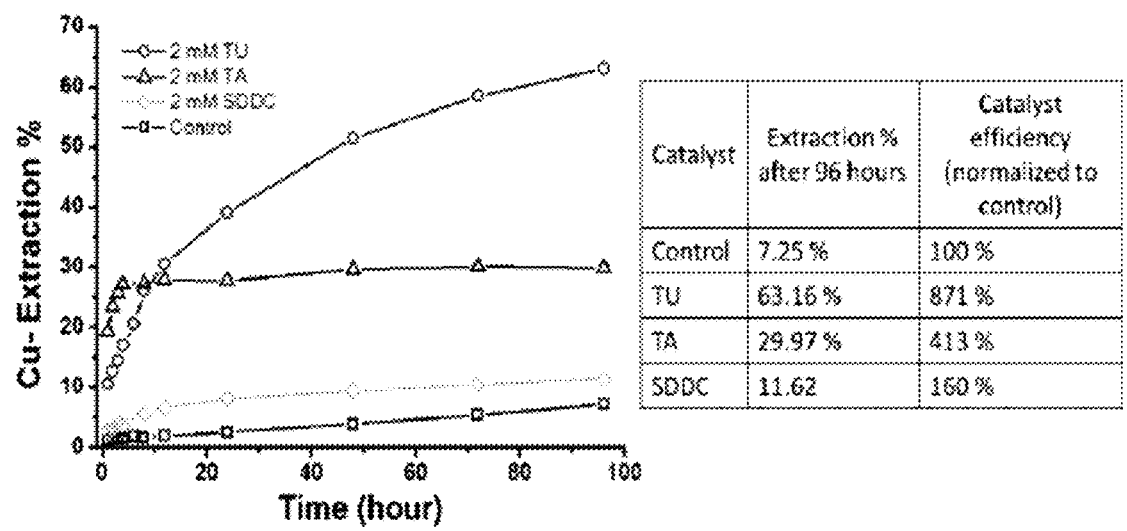
FIG. 19 is a graph showing leaching of copper from covellite in stirred reactor tests using reagents comprising thiocarbonyl functional groups. Circles pertain to Tu, triangles pertain to TA, diamonds pertain to SDDC, and squares pertain to controls.
Figure 20:
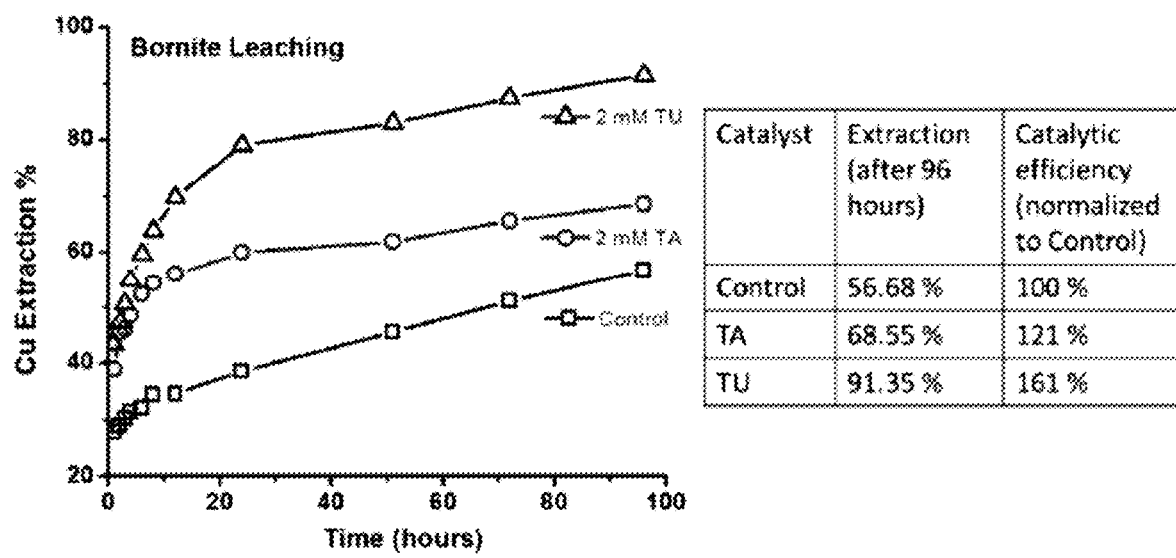
FIG. 20 is a graph showing leaching of copper from bornite in stirred reactor tests using reagents comprising thiocarbonyl functional groups. Triangles pertain to Tu, circles pertain to TA, and squares pertain to controls.
Figure 21:
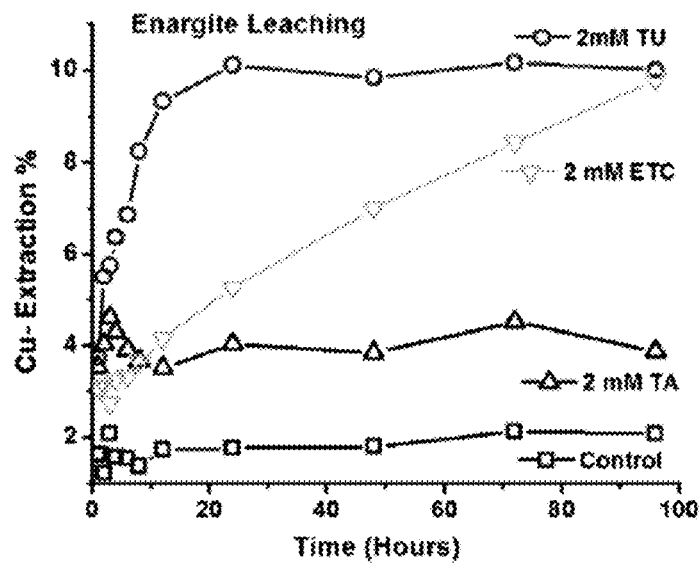
FIG. 21 is a graph showing leaching of copper from enargite in stirred reactor tests using reagents comprising thiocarbonyl functional groups. Circles pertain to Tu, triangles pertain to TA, inverted triangles pertain to ETC, and squares pertain to controls.

The Tu dosage vs. Cu extraction at 172 hours is plotted in FIG. 17. An initial Tu dosage up to 5 mM appears to have the most pronounced effect on the dissolution of Cu.

As indicated above, in previous shakeflask tests with acidic solutions (pH 1.8) containing various concentrations of $Fe^{3+}$ and $Cu^{2+}$ ions, slight precipitation occurred upon the addition of 4 mM of Tu due to the decomposition of FDS. Accordingly, concentrations of Tu concentration below 4 mM may avoid such precipitation. A series of shakeflask tests were performed on solutions containing initial concentrations of 2 mM Tu and various concentrations in a matrix containing $Fe^{3+}$ (0-100 mM) and $Cu^{2+}$ (0-50 mM) in order to identify concentration ranges of $[Fe^{3+}]$ and $[Cu^{2+}]$ that do not result in Cu complex precipitation. The results showed that no precipitation and no loss of Cu from the solution phase resulted using 2 mM of Tu in this wide range of Fe and Cu matrix concentrations.

Example 4 Alternative Reagents

The catalytic effect of several other reagents having a thiocarbonyl functional group was examined on the leaching of synthetic chalcopyrite, covellite, bornite, and enargite.

Experiments were carried out in stirred reactors containing 40 mM ferric sulfate solution at pH 1.8. 1 g of chalcopyrite or covellite was added to the reactors along with an initial concentration of 2 mM of various thiocarbonyl reagents including Tu, TA, SDDC, ETC and TSCA. The Cu extraction curves for chalcopyrite, covellite, bornite, and enargite using all or a subset of the above reagents are shown in FIGS. 18, 19, 20, and 21.

From FIGS. 18 to 21, it is clear that each of these further reagents that have a thiocarbonyl functional group show a beneficial effect in the ferric sulfate leaching of each of chalcopyrite, covellite, bornite and enargite.

Figure 22:
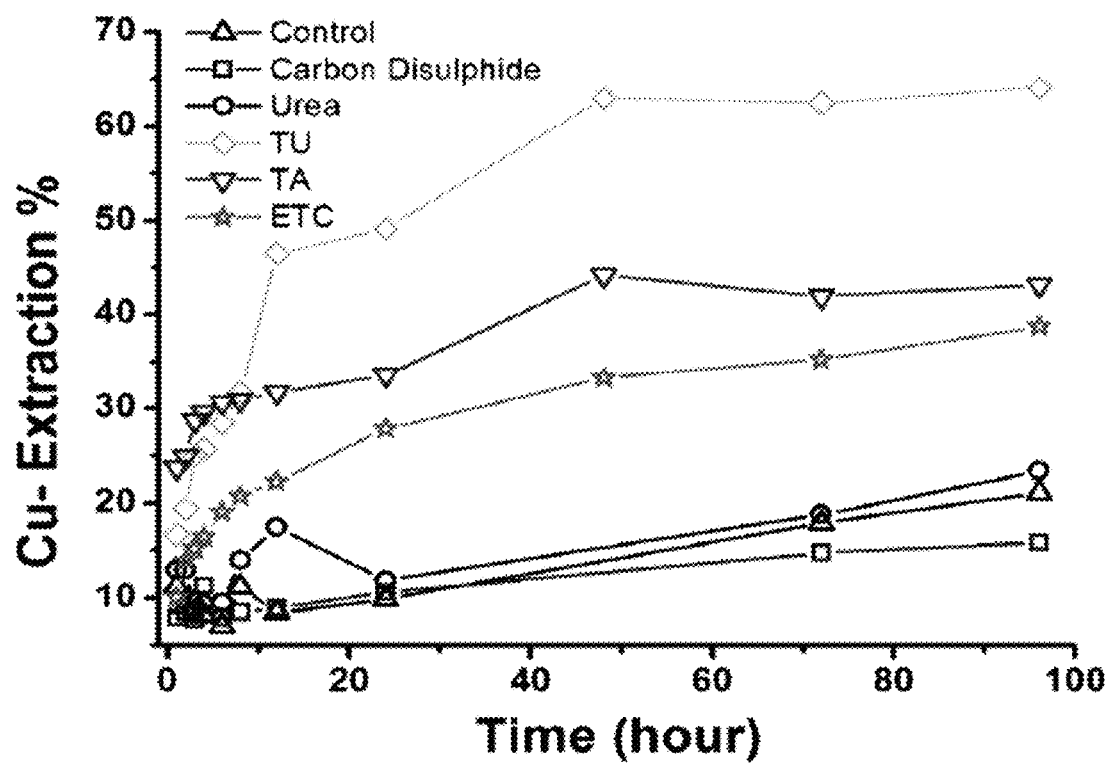
FIG. 22 is a graph showing the leaching of copper from chalcopyrite in stirred reactor tests using reagents comprising thiocarbonyl functional groups, urea, and carbon disulfide. Circles pertain to urea, triangles pertain to controls, inverted triangles pertain to TA, diamonds pertain to Tu, stars pertain to ETC, and squares pertain to carbon disulfide.

FIG. 22 summarizes the results of further stirred reactor tests on chalcopyrite that additionally investigate urea and carbon disulfide. These results confirm that, as expected, neither urea nor carbon disulfide are effective reagents.

Example 5 FDS

The catalytic effect of leaching solutions prepared with FDS on chalcopyrite, bornite, covellite, and chalcocite leaching was determined in stirred reactor tests. All reactors contained 1.9 L of ferric sulfate solution at pH 1.8 and total iron concentration of 40 mM. 1 g of mineral samples was used in each reactor test. An initial FDS concentration of 1 mM or an initial Tu concentration of 2 mM Tu was used.

Figure 23:
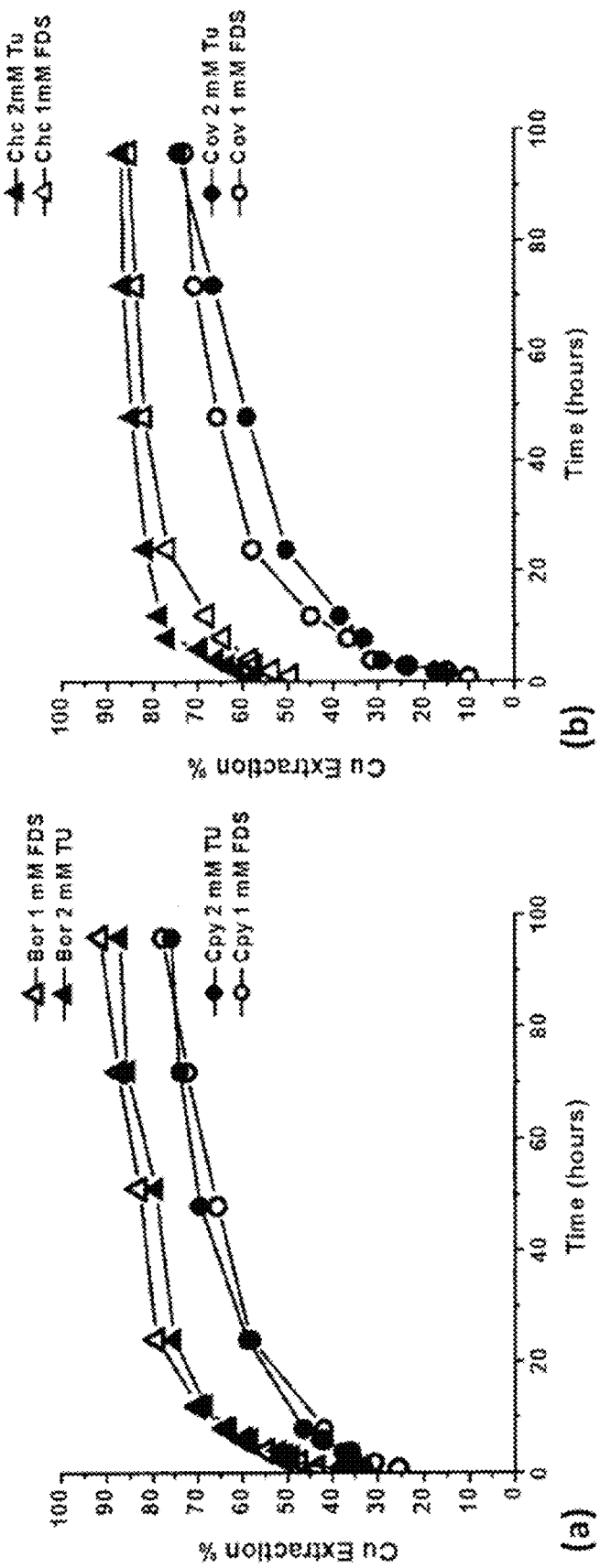
FIG. 23, panel a, is a graph comparing the leaching of copper from chalcopyrite (circles) or bornite (triangles) using leaching solutions with either an initial concentration of 2 mM Tu (solid symbols) or an initial concentration of 1 m FDS (open symbols)

The results from stirred reactor tests shown in FIG. 23, panel a, and FIG. 23, panel b. demonstrate that FDS has comparable efficiency to Tu in the leaching of each of chalcopyrite, bornite, covellite, and chalcocite after 96 hours.

Example 6 Stepwise Closed Loop Bioleaching with Tu

A closed loop bioleach with Tu was conducted. 7 kg of ore contain approximately 0.25% Cu content, mainly in the form of $CuFeS_2$ was leached at a flow rate of 1 L/day at an aeration rate of approximately 300 mL/min.

The ore was pre-treated with sulfuric acid to leach oxides (e.g. chalcanthite and basic copper salts) using sulfuric acid. After the acid leaching period finished, residual solutions were collected and replaced by a ferrous sulfate solution with nutrients (40 mM $FeSO_4$, 0.4 g/L magnesium sulfate heptahydrate and 0.04 g/L potassium dihydrogen phosphate, with pH adjusted to 1.6-1.8). The ferrous and nutrients solution was flushed through the column to establish a good habitat for bacterial growth. Inoculation of bacteria showed an increase in the ORP from 274 mV to 550 mV within 48 hours. The solution used in this step and future steps was kept circulating through the column, forming a self-sustaining closed-loop system.

At this stage, the remaining copper source is mainly $CuFeS_2$. After the bacteria had survived in the column, Tu was progressively added to the leaching solution. As discussed above Tu is converted to FDS at a molar ratio of 2:1 in the presence of 40 mM $Fe^{3+}$. Operating potential (ORP) was used as the indicator for bacterial activity, and HPLC was used to monitor FDS content. From day 0 to day 50, the leaching solution included 40 mM $Fe^{3+}$ with inoculated bacteria (with no Tu addition). From day 90 to day 98, a total of 1.878 g of Tu was progressively added, upon which the HPLC analysis on the effluent showed that the FDS was being maintained at approximately 1.5 mM, and no more Tu was added.

Figure 24:
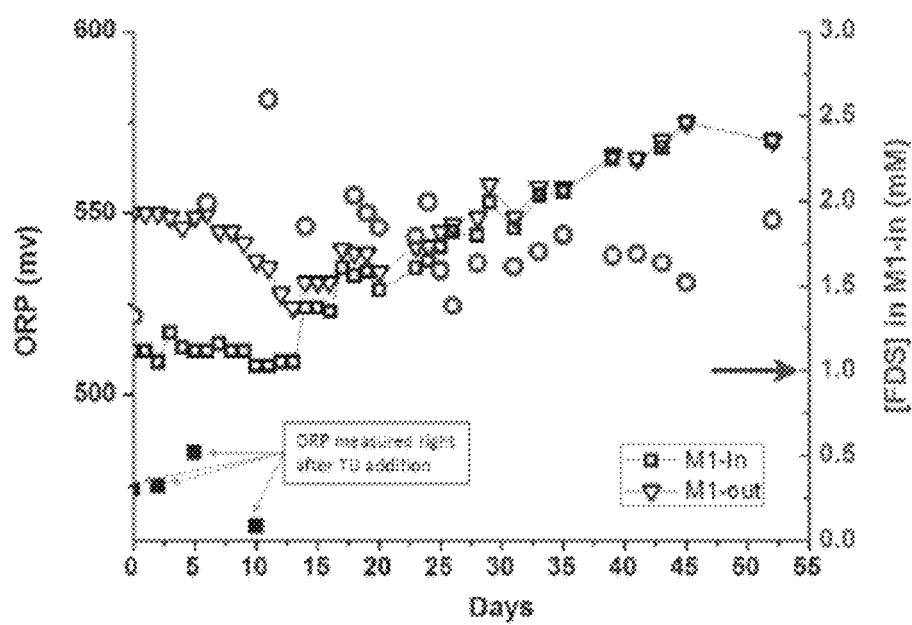
FIG. 24 is a graph monitoring bacterial activity and FDS content with ORP and HPLC.

As shown in FIG. 24, the ORP of the effluent was always equal to or higher than the influent, indicating that bacteria were actively oxidizing $Fe_2^+$ to $Fe^{3+}$. The FDS contents were analyzed by HPLC, showing that approximately 1.5 mM of FDS (equivalent to 3 mM of Tu added) existing in the solution phase without any precipitation being observed. Therefore, it appears that 1.5 mM FDS (3 mM Tu equivalent) may be used in the solution without precipitation of ferric.

Figure 25:
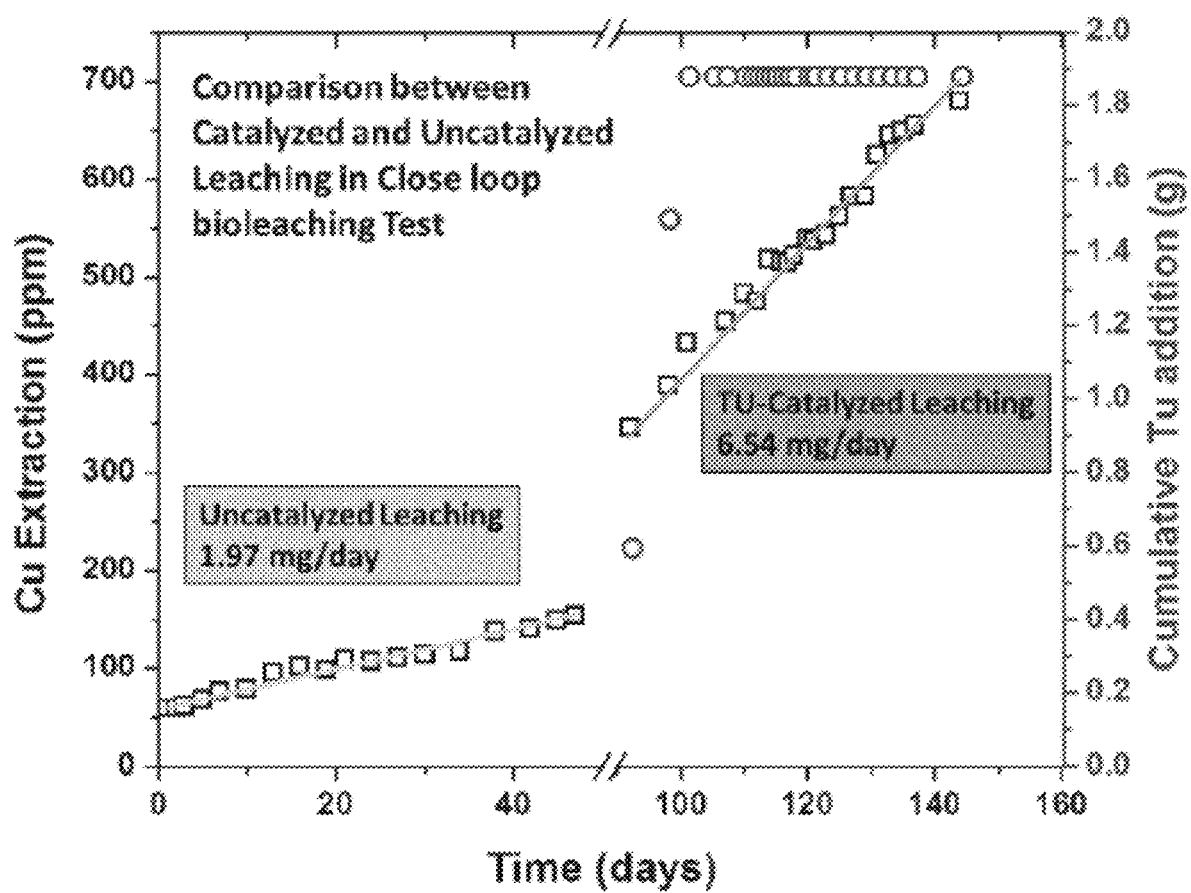
FIG. 25 is a graph showing the bioleaching of $CuFeS_2$ using only $Fe^{3+}$ (day 0-50) and using $Fe^{3+}$+Tu (day 90-150) in closed loop experiments.

The results of closed loop leaching test are shown in FIG. 25. From day 0 to day 50, bacteria were able to maintain high activity and oxidize $Fe_2^+$ to $Fe^{3+}$. However, with the constant flow rate (1 L/day), the leaching rate was only 1.97 mg Cu/day for the first 50 days. Addition of Tu starting on day 90 increased the Cu extraction rate to 6.54 mg/day, which remained constant after day 98. This indicates that the reagent did not undergo decomposition and remained effective in the closed-loop system.

While specific embodiments of the invention have been described and illustrated, such embodiments should be considered illustrative of the invention only and not as limiting the invention as construed in accordance with the accompanying claims.

What is claimed is:

1. A method of recovering at least one base metal from at least one base metal sulfide in a material, the method comprising:
    contacting a material comprising at least one base metal sulfide with an acidic sulfate solution comprising a reagent having a thiocarbonyl functional group, wherein the reagent is thioacetamide (TA), to produce a pregnant solution containing base metal ions; and
    recovering the at least one base metal from the at least one base metal sulfide from the pregnant solution.

2. The method of claim 1, wherein the acidic sulfate solution further comprises ferric sulfate.

3. The method of claim 1, wherein the concentration of the reagent in the acidic sulfate solution is in the range of about 0.2 mM to about 30 mM.

4. The method of claim 1, wherein the concentration of the reagent in the acidic sulfate solution is in the range of about 0.2 mM to about 20 mM.

5. The method of claim 1, wherein the concentration of the reagent in the acidic sulfate solution is in the range of about 0.2 mM to about 10 mM.

6. The method of claim 1, wherein the concentration of the reagent in the acidic sulfate solution is in the range of about 0.2 mM to about 5 mM.

7. The method of claim 1, wherein the concentration of the reagent in the acidic sulfate solution is in the range of about 0.2 mM to about 4 mM.

8. The method of claim 1, wherein the concentration of the reagent in the acidic sulfate solution is in the range of about 0.2 mM to about 3 mM.

9. The method of claim 1, wherein the concentration of the reagent in the acidic sulfate solution is in the range of about 0.2 mM to about 2 mM.

10. The method of claim 1, wherein the concentration of the reagent in the acidic sulfate solution is in the range of about 0.2 mM to about 1.5 mM.

11. The method of claim 1, wherein the concentration of the reagent in the acidic sulfate solution is in the range of about 0.2 mM to about 1.0 mM.

12. The method of claim 1, wherein the concentration of the reagent in the acidic sulfate solution is in the range of about 0.2 mM to about 0.5 mM.

13. The method of claim 1, wherein the at least one base metal sulfide includes at least one copper sulfide.

14. The method of claim 13, wherein the at least one copper sulfide includes chalcopyrite.

15. The method of claim 13, wherein the at least one copper sulfide includes covellite.

16. The method of claim 13, wherein the at least one copper sulfide includes bornite.

17. The method of claim 13, wherein the at least one copper sulfide includes enargite.

18. The method of claim 13, wherein the at least one copper sulfide includes a copper sulfide of the formula $Cu_xS_y$ wherein the x:y ratio is between 1 and 2.

19. The method of claim 13, wherein the at least one copper sulfide includes chalcocite.

20. The method of claim 13, wherein the at least one copper sulfide includes djurleite.

21. The method of claim 13, wherein the at least one copper sulfide includes digenite.

22. The method of claim 1, wherein the at least one base metal sulfide includes a cadmium sulfide.

23. The method of claim 22, wherein the cadmium sulfide is greenockite.

24. The method of claim 1, wherein the at least one base metal sulfide includes at least one nickel sulfide.

25. The method of claim 24, wherein the at least one nickel sulfide includes pentlandite.

26. The method of claim 24, wherein the at least one nickel sulfide includes violarite.

27. The method of claim 1, wherein the material is an ore.

28. The method of claim 1, wherein the material is a concentrate of the at least one base metal sulfide.

29. The method of claim 1, wherein the material comprises agglomerated particles.

30. The method of claim 1, wherein ferric ions are used to oxidize the metal sulfide.

31. The method of claim 30, wherein the ferric ions are generated at least in part by bacteria.

32. The method of claim 1, wherein the method is a percolation leach.

33. The method of claim 32, wherein the percolation leach is a heap leach.

34. The method of claim 1, wherein the leach is a vat leach.

35. The method of claim 1, wherein the method is a tank leach.

36. The method of claim 1, wherein the method is a column leach.

37. The method of claim 1, wherein recovering the at least one base metal from the pregnant solution comprises solvent extraction and electrowinning.

38. The method of claim 1, further comprising maintaining the operating potential of the acidic sulfate solution above 500 mV vs Ag/AgCl.

* * * * *